(12) United States Patent
Pickens et al.

(10) Patent No.: US 9,419,446 B2
(45) Date of Patent: *Aug. 16, 2016

(54) ADAPTIVE BATTERY PACK-TO-UNIVERSAL SERIAL BUS POWER DEVICES

(71) Applicant: Custom LeatherCraft Manufacturing Co., Inc., South Gate, CA (US)

(72) Inventors: Ron A. Pickens, Owasso, OK (US); Matthew D. Noble, Los Angeles, CA (US)

(73) Assignee: Custom LeatherCraft Manuf. Co., Inc., South Gate, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/494,759

(22) Filed: Sep. 24, 2014

(65) Prior Publication Data

US 2015/0318716 A1    Nov. 5, 2015

Related U.S. Application Data

(63) Continuation-in-part of application No. 14/266,990, filed on May 1, 2014.

(51) Int. Cl.
*H01M 10/46* (2006.01)
*H02J 7/00* (2006.01)

(52) U.S. Cl.
CPC ............. *H02J 7/0003* (2013.01); *H02J 7/0042* (2013.01); *H02J 7/0044* (2013.01); *H02J 7/0052* (2013.01); *H02J 2007/0062* (2013.01)

(58) Field of Classification Search
CPC ........ H02J 7/0042; H02J 7/355; H02J 7/0003
USPC .......... 320/103, 107, 110, 111, 114, 115, 138
See application file for complete search history.

(56) References Cited

U.S. PATENT DOCUMENTS

| | | | | |
|---|---|---|---|---|
| 5,280,229 | A * | 1/1994 | Faude | H02J 7/0045 320/110 |
| 2012/0262117 | A1* | 10/2012 | Ferber | H02J 7/0047 320/111 |
| 2014/0327401 | A1* | 11/2014 | Pickens | H02J 7/0042 320/127 |
| 2015/0084578 | A1* | 3/2015 | Pickens | H02J 7/0054 320/103 |
| 2015/0084592 | A1* | 3/2015 | Pickens | H02J 7/0045 320/112 |
| 2015/0084596 | A1* | 3/2015 | Pickens | A45F 5/021 320/127 |
| 2015/0318716 | A1* | 11/2015 | Pickens | H02J 7/0003 320/110 |

* cited by examiner

*Primary Examiner* — Edward Tso

(57) ABSTRACT

A battery pack receptacle removably connects to a particular one of multiple battery pack adapters for particular battery packs used for cordless power tool devices. A universal serial bus (USB) receptacle is connected to the battery pack receptacle. The battery pack is used as a power source for the USB receptacle. Each of the multiple battery pack adapters is configured for a different type of battery pack.

20 Claims, 22 Drawing Sheets

ADAPTIVE BATTERY PACK-TO-UNIVERSAL SERIAL BUS POWER DEVICES

CROSS-REFERENCE TO RELATED APPLICATIONS

This application is a continuation-in-part of U.S. application Ser. No. 14/266,990, filed May 1, 2014, which claims the priority benefit of U.S. Provisional Patent Application Ser. No. 61/818,714, filed May 2, 2013, incorporated herein by reference in its entirety.

TECHNICAL FIELD

One or more embodiments relate generally to providing universal serial bus (USB) power, and in particular, use of an adaptive tool battery pack receptacle as a power source for USB devices for a utility bag or other housing.

BACKGROUND

Many people use utility bags and luggage for holding items for organization and convenience, and to carry the items from one place to another. Many instances, portable cordless power tools are carried in the utility bags.

SUMMARY

One or more embodiments relate to cordless device battery pack power used for universal serial bus (USB) devices. In one embodiment, an apparatus includes a battery pack receptacle that removably connects to a particular one of multiple battery pack adapters for particular battery packs used for cordless power tool devices. A universal serial bus (USB) receptacle is connected to the battery pack receptacle. The battery pack is used as a power source for the USB receptacle. Each of the multiple battery pack adapters is configured for a different type of battery pack.

One embodiment provides a system comprising: a utility bag, a battery pack receptacle, and a plurality of battery pack adapters that are each configured for coupling to the battery pack receptacle. In one embodiment, each of the plurality of battery pack adapters is configured for removably coupling with a particular type of battery pack used for a cordless power tool device. In one embodiment, a USB receptacle is coupled to the utility bag. At least one USB port is coupled to the battery pack receptacle. The battery pack receptacle transfers power from a received particular type of battery pack through a particular one of the plurality of battery pack adapters and to the USB receptacle, the USB port, or the USB receptacle and the USB port.

These and other features, aspects and advantages of the one or more embodiments will become understood with reference to the following description, appended claims and accompanying figures.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The following description is made for the purpose of illustrating the general principles of the one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several embodiments for battery pack adapters and receptacles for transferring power from a cordless device battery pack to a USB receptacle/port for a utility bag, as well as operation and/or component parts thereof. While the following description will be described in terms of cordless device battery pack power for USB devices, for clarity and to place the one or more embodiments in context, it should be kept in mind that the teachings herein may have broad application to all types of systems, devices and applications.

One or more embodiments relate to cordless device battery pack power used for USB devices. In one embodiment, an apparatus includes a battery pack receptacle that removably connects to a particular one of multiple battery pack adapters for particular battery packs used for cordless power tool devices. A universal serial bus (USB) receptacle is connected to the battery pack receptacle. The battery pack is used as a power source for the USB receptacle. Each of the multiple battery pack adapters is configured for a different type of battery pack.

One embodiment of the invention includes charging/powering an electronic device that may be employed in multiple housings, such as utility bags, fishing bags, backpacks, duffel bags, tool boxes, tool carriers, sports bags, luggage, emergency services bags, cases, coolers, etc. It should be noted that while utility bags are shown and discussed for housing the embodiments, other housings may also be implemented (e.g., pocket books, fanny packs, stand-alone containers or devices, bucket bags, clothing, compartments, holsters, etc. In other embodiments, no housing is required and the battery pack receptacle and USB receptacle or port may be integrated into a single component or housing without a utility bag or other container, or for placement on a platform (e.g., a ladder, table, floor, chair, etc.).

Figure 1:
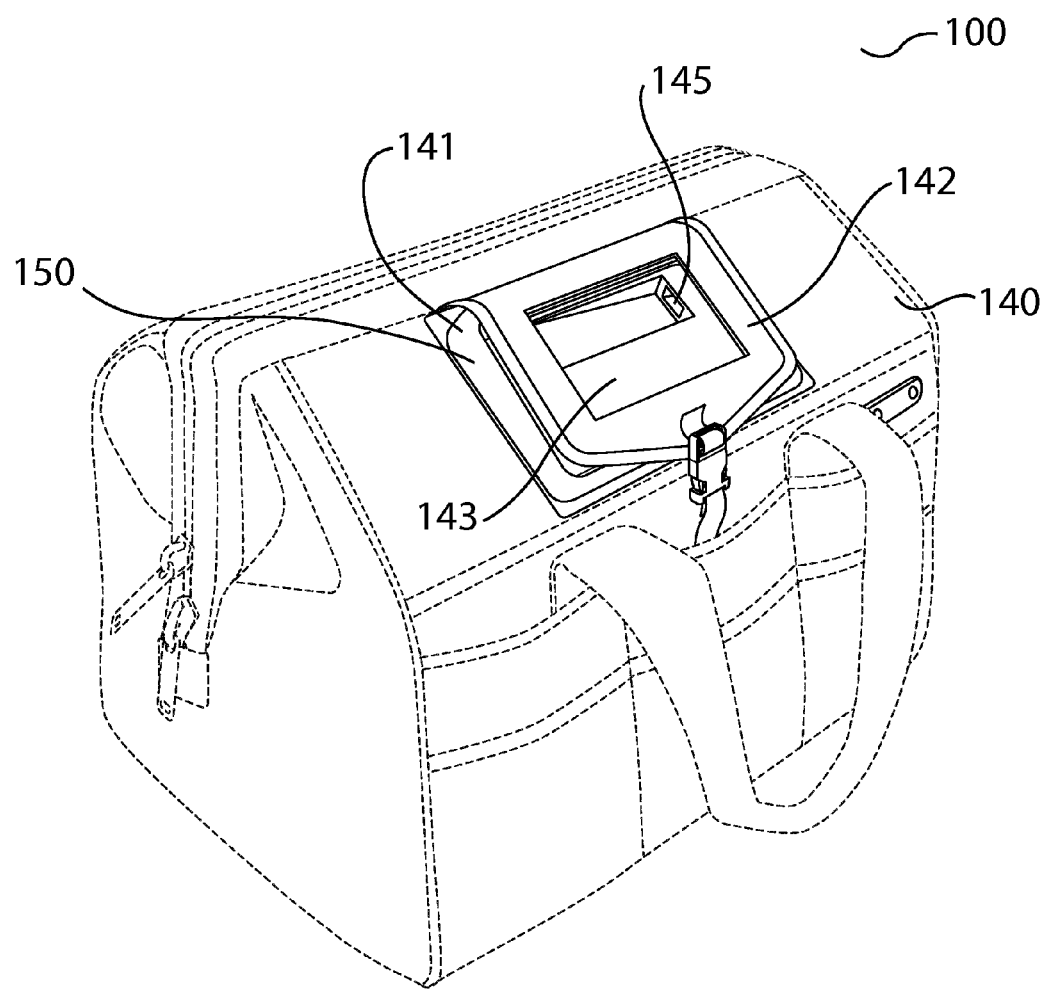
FIG. 1 illustrates a perspective view of an electronic device holder for a charging/powering device showing an example utility bag according to one embodiment.

FIG. 1 illustrates a perspective view of an electronic device platform or holder 150 for a charging/powering device or system 100 showing an example utility bag 140 according to one embodiment. In one embodiment, the electronic device platform or holder 150 includes a cover 142, and a USB port or receptacle 145. In one embodiment, the cover 142 may include a see through window 143 or protective covering.

In one embodiment, the electronic device holder 150 may be a separate formed component that may be integrated into a device, such as utility bags, bags, cases, boxes, coolers, etc. In one embodiment, the electronic device holder 150 may be integrated or molded into a device, such as utility bags, bags, cases, boxes, coolers, etc.

In one embodiment, a utility bag, such as example utility bag 140, may have a surface or platform 141 for placement of the electronic device holder 150. In other embodiments, the electronic device holder 150 may be positioned in a pocket, clipped to a pocket, part of a pocket, positioned inside a utility bag, part of a wall of a utility bag (e.g., a side-wall, an end-wall, etc.), container, case, box, cooler, etc. as desired.

Figure 2:
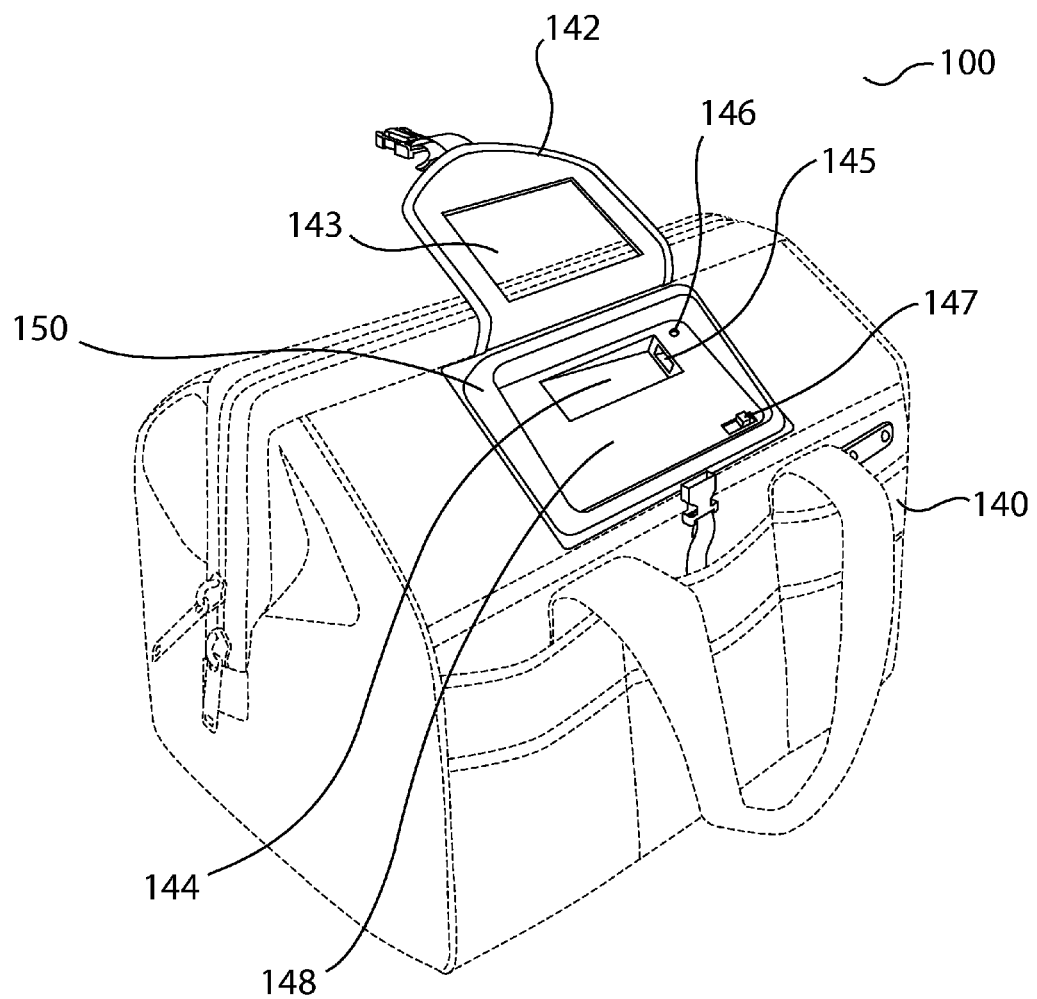
FIG. 2 illustrates a perspective view of an electronic device holder showing a cover opened for a charging/powering device showing an example utility bag according to one embodiment of the invention.

FIG. 2 illustrates a perspective view of an electronic device holder 150 showing a cover 142 opened for a charging/powering system or device 100 showing an example utility bag 140 according to one embodiment. In one embodiment, the electronic device holder 150 includes a USB connector platform or slot 144. In one embodiment, the USB connector platform 144 is angled and has a depth such that a USB connector for an electronic device (e.g., a cell phone, a music player, a pad device, a PDA, GPS device, USB reserve battery, etc.) may be connected to the USB receptacle 145 and placed in the USB connector platform 144 so that upon an electronic device being placed in the electronic device placement portion 148, the USB connector is positioned underneath or out of the way for a flat fitment of the electronic device in the electronic device placement portion 148.

Figure 6:
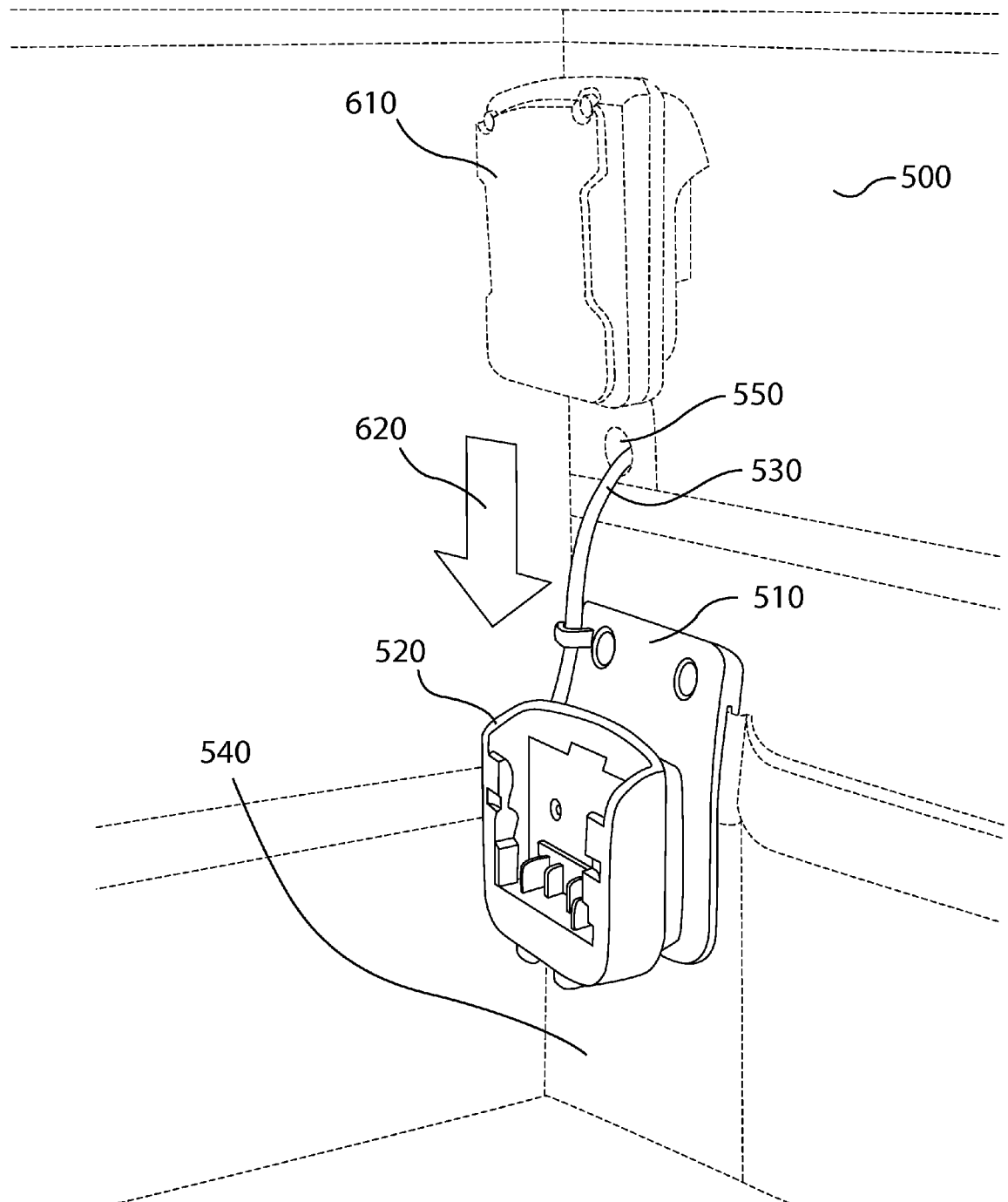
FIG. 6 illustrates an interior view of the charging/powering device showing the battery pack receptacle connected to an example utility bag and showing integrated wiring showing an example battery pack moving in a direction to slide within the receptacle according to one embodiment.

In one embodiment, the charging/powering system or device 100 includes a switch 147 for allowing charging or power to be connected to the USB receptacle 145 from a battery pack, such as a battery pack from a portable tool (e.g., example battery pack 610, FIG. 6). In one embodiment, the switch 147 may be any type of switch, such as a slide switch device, a push button device, a touch device, etc.

In one embodiment, the charging/powering system or device 100 includes an indicator light 146 for indicating information, such as power on/off, type of device connected, etc. In one embodiment, a readout display (not shown) may inform users of percent power remaining from a charging/powering battery pack (e.g., example battery pack 610, FIG. 6), time to recharge, time to replace, etc. In one embodiment, an integrated circuit connected to the USB receptacle 145 and battery pack receptacle 520 (FIG. 5) and provides the aforementioned functions.

Figure 3:
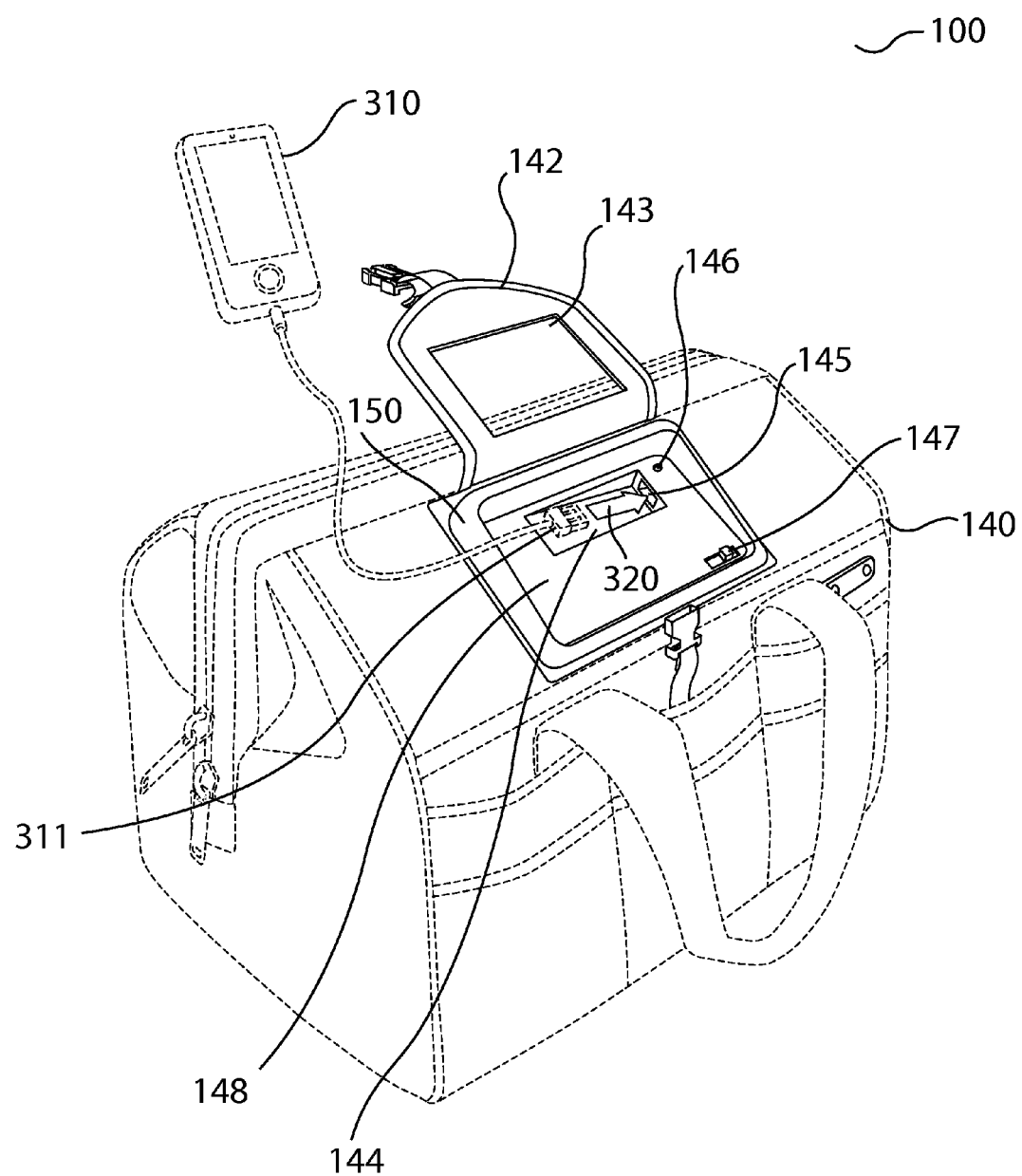
FIG. 3 illustrates a perspective view of an electronic device holder showing a cover opened for a charging/powering device showing an example electronic device and an example utility bag according to one embodiment.

FIG. 3 illustrates a perspective view of an electronic device holder 150 showing a cover 142 opened for the charging/powering system or device 100 showing an example electronic device 310 (e.g., a cell phone) and an example utility bag 140 according to one embodiment. In one embodiment, the USB connector or plug 311 of the example electronic device 310 is slid in the USB connector platform 144 and into the USB receptacle or port 145 in the direction of the arrow

320. In one embodiment, a slot or groove is included on the electronic device placement portion 148 and the electronic device holder 150 for holding and protecting USB wire when the electronic device (e.g., electronic device 310) is used outside of the electronic device holder 150. In another embodiment, a wire placement portion comprises a groove, window/door, slot or area to hold the USB wire for organization and protection while an electronic device is placed within the electronic device holder 150.

Figure 4:
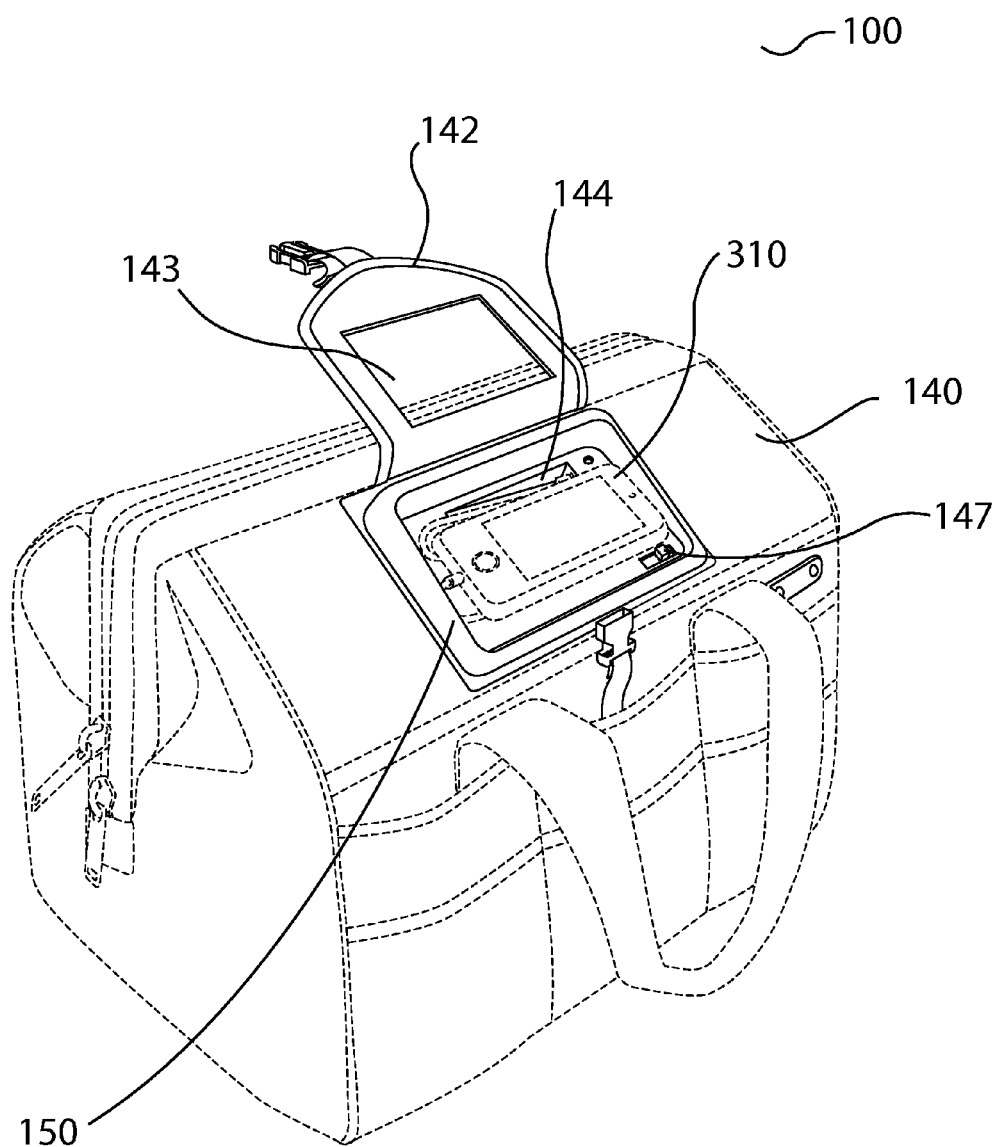
FIG. 4 illustrates a perspective view of an electronic device holder showing a cover opened with an example electronic device placed therein for a charging/powering device showing an example utility bag according to one embodiment.

FIG. 4 illustrates a perspective view of an electronic device holder 150 showing the cover 142 opened with an example electronic device 310 placed therein for the charging/powering system or device 100 showing an example utility bag 140 according to one embodiment. As shown, the example electronic device 310 fits within the electronic device holder 150 and over the USB connector platform 144 for a neat and organized placement of the electronic device 310 and the USB connector 311 and USB wire.

Figure 5:
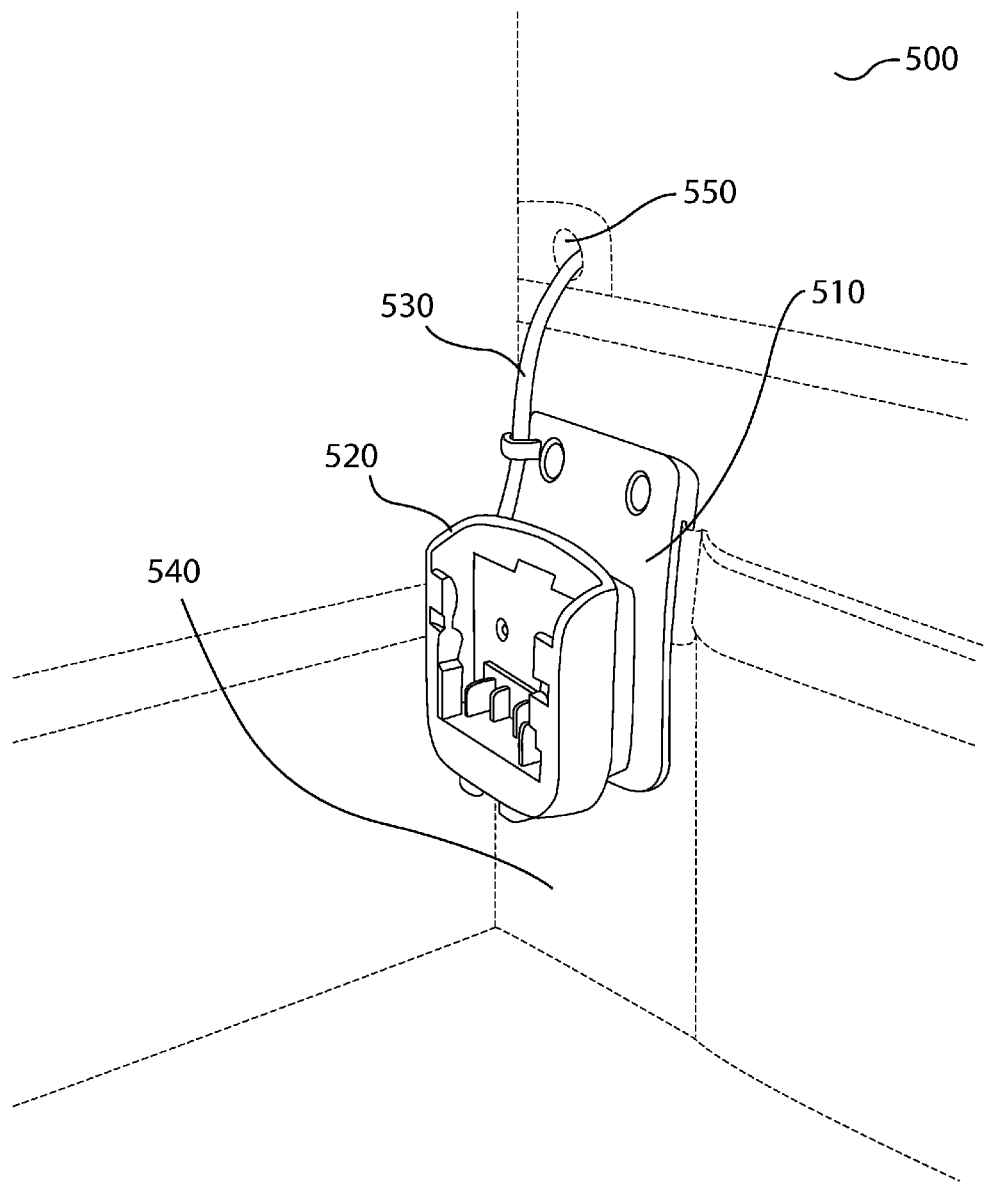
FIG. 5 illustrates an interior view of a charging/powering device showing a battery pack receptacle connected to an example utility bag showing integrated wiring according to one embodiment.

FIG. 5 illustrates an interior view of a battery pack receptacle system 500 showing a battery pack receptacle 520 connected to an example utility bag 140 showing integrated wiring 530 according to one embodiment. In one embodiment, the battery pack receptacle 520 is attached to the interior 540 of an example utility bag. In one embodiment, the battery pack receptacle 520 includes an attachment portion 510 that may be permanently or removably connected to a device, such as example utility bag (e.g., utility bag 140), a box, case, container, sporting bag, rolling bag, luggage, cooler, etc.

In one embodiment, the attachment portion 510 may include a clip or slide portion that fits within a pocket. In one embodiment, the attachment portion 510 may be attached to a utility bag using hook and loop fasteners. In another example embodiment, the attachment portion 510 may be permanently attached to a utility bag, for example, using rivets, nuts and bolts, heat welding, epoxy welding, etc. In another example embodiment, the battery pack receptacle system 500 may be disposed in an internal or external pocket or holding portion of a utility bag.

In one embodiment, the battery pack receptacle 510 may be specific to a manufacturer in order to only fit specific types of battery packs. In other embodiments, the battery pack receptacle 510 may be a universal type of receptacle to fit one or more types of battery packs from one or more manufacturers. In one embodiment, the battery pack receptacle may hold battery packs having different types of voltages, such as 12 V., 18 V., 24 V., 36 V., etc. In one embodiment, the charging/powering device 100 includes a circuit that limits voltage/amperage for different types of electronic devices, which may have different power requirements. In one embodiment, the USB receptacle may be used for a USB connector that is plugged into a wall outlet conversion device or computer, etc. for charging the battery pack. In one embodiment, battery pack receptacle 510 embodiments include a circuit that limits voltage/amperage for different types of electronic devices, which may have different power requirements. It should be noted that cordless device battery packs typically include a specifically designed housing with specific designed housing contours and electrical connections that are unique to each brand or manufacturer. The specific designed contours and electrical connections (or electrical contacts) are uniquely designed for the brand or manufacturer's cordless tools and battery pack chargers. One brand or manufacturer's battery packs do not work in other brand or manufacturer's cordless tools or battery pack chargers since the electrical contacts and contours are different from each other. The battery packs include multiple rechargeable batteries that are included in a housing that transfers the combined voltage from the multiple rechargeable batteries through electrical contacts on the exterior of the housing. In this way, a user just needs to slide in or insert the battery pack into a cordless power tool to take advantage of the combined voltage or power from the multiple batteries internal to the battery pack.

In one embodiment, the charging/powering device 100 and battery pack receptacle system 500 detects the type of device connected to the USB port 145 and may indicate the type of device with specific number of flashes from the indicator light 146. In one embodiment, the wiring 530 may pass from the interior 540 of a utility bag to a power source managing/control circuit or directly to the USB receptacle or port 145 through an opening 550 or protective channel in the utility bag or apparatus.

FIG. 6 illustrates an interior view of the battery pack receptacle system 500 showing the battery pack receptacle 520 connected to the interior 540 of example utility bag 140 and showing integrated wiring 530 showing an example battery pack 610 moving in a direction of arrow 620 to slide or dock within the receptacle 520 according to one embodiment. In one embodiment, the battery pack receptacle is similar to a receptacle for charging battery packs used for cordless devices or tools (e.g., cordless drills, cordless screwdrivers, cordless saws, cordless garden tools, cordless sanders, etc. In one embodiment, the battery pack receptacle 520 includes metal connectors that make contact with contacts of an inserted battery pack (e.g., example battery pack 610) for passing electricity from the battery pack 610 to the battery pack receptacle 520 and through the wire 530 (to the USB receptacle or port 145).

Figure 7:
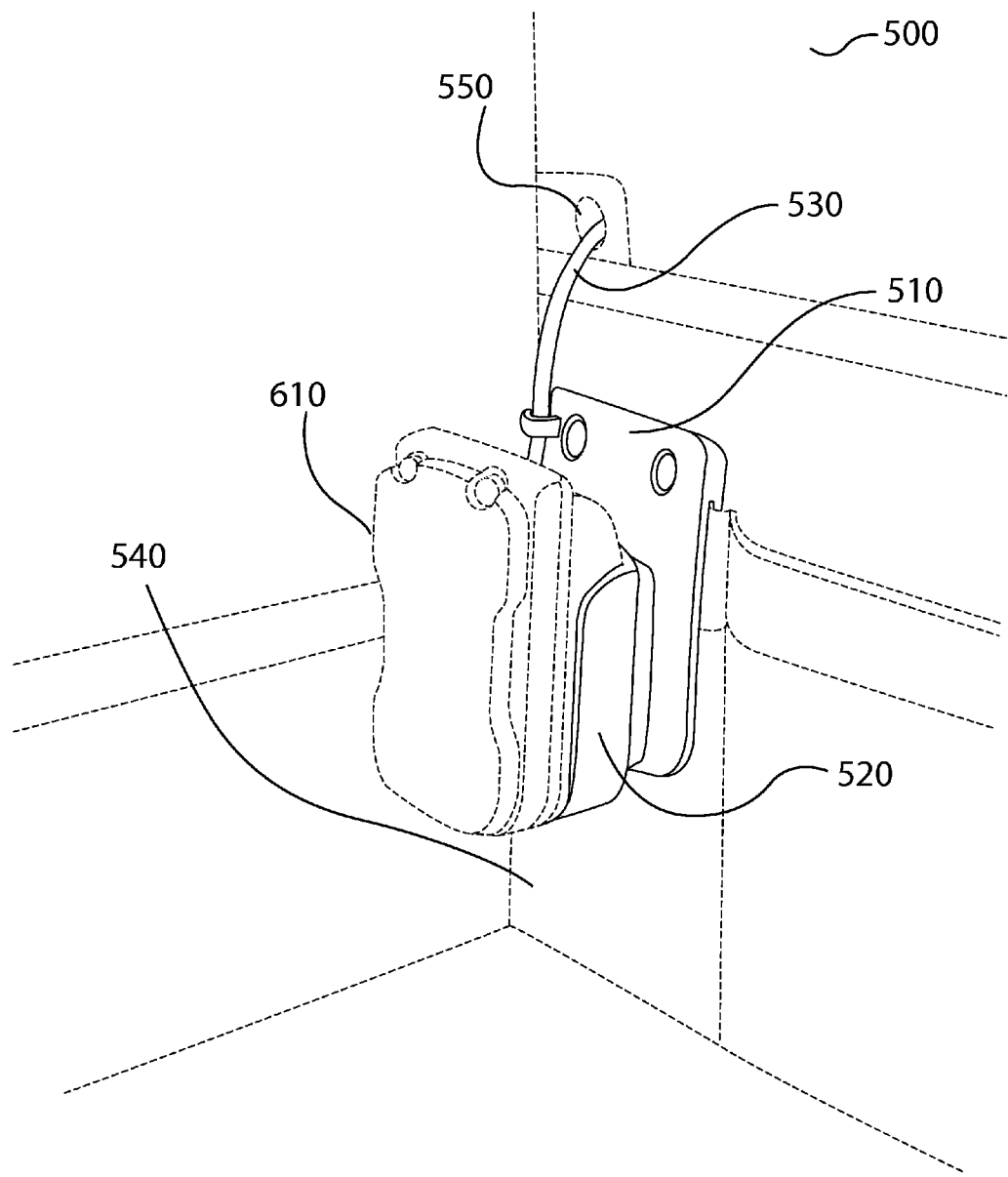
FIG. 7 illustrates an interior view of the charging/powering device showing the battery pack receptacle connected to an example utility bag showing integrated wiring and showing an example battery pack connected within the receptacle according to one embodiment.

FIG. 7 illustrates an interior view of the battery pack receptacle device or system 500 showing the battery pack receptacle 520 connected to the interior 540 of an example utility bag 140 showing integrated wiring 530 and showing an example battery pack 610 connected within the receptacle 520 according to one embodiment. In one embodiment, the battery pack attachment portion 510 is movable to multiple connection portions of the interior portion 540 of the utility bag in order to fit different sized battery packs. In one embodiment, the battery pack receptacle 520 includes multiple sized slots/grooves and multiple placed electrical connectors for fitment of different battery pack sizes and or battery packs of different voltages.

Figure 8:
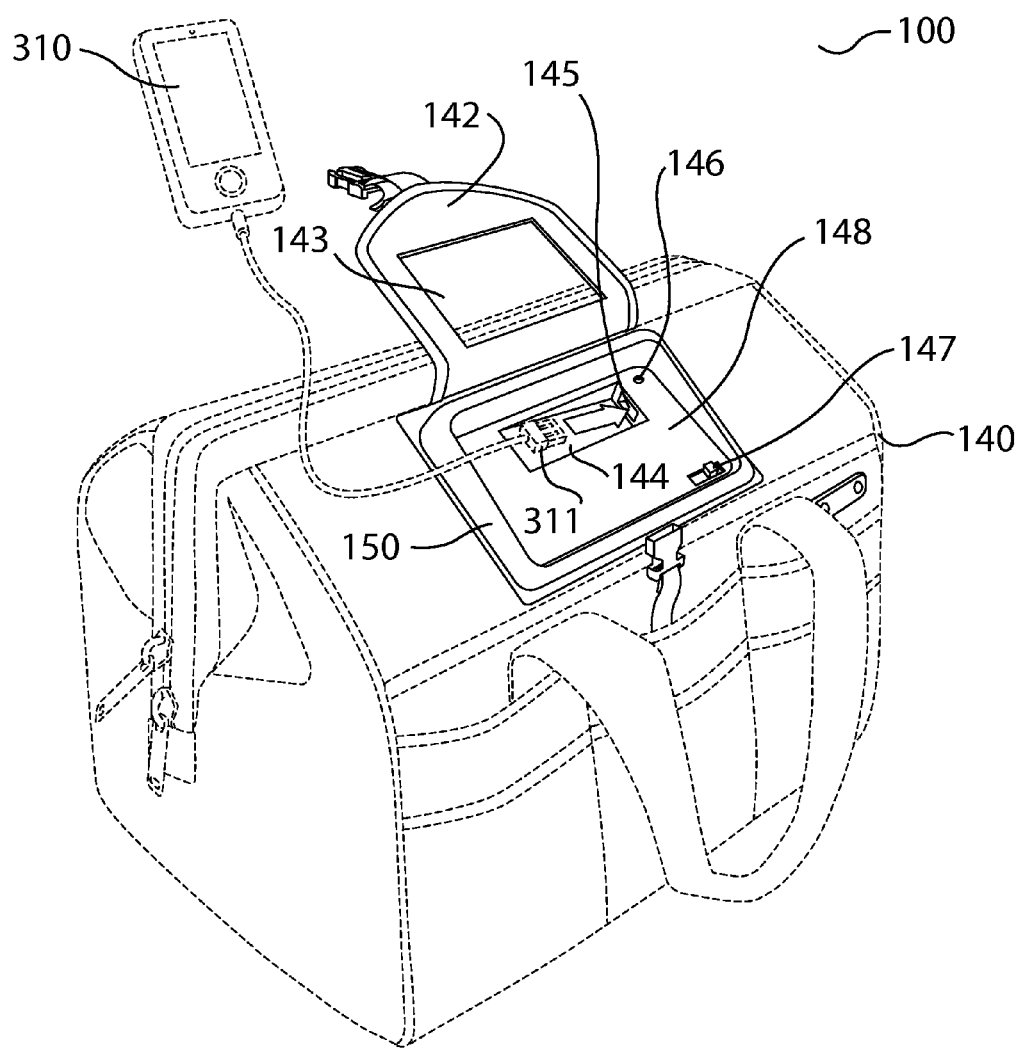
FIG. 8 illustrates a perspective view of an electronic device holder showing a cover opened with an example electronic device being connected to a USB receptacle for and showing an example utility bag according to one embodiment.

FIG. 8 illustrates a perspective view of the electronic device holder 100 showing a cover 142 opened with an example electronic device 310 being connected to a USB receptacle 145 via a USB cord and connector 311 for and showing an example utility bag 140 according to one embodiment. In one embodiment, the electronic device platform or holder 150 and/or the battery pack receptacle 520 and respective components may be made of one or more of: ABS, reinforced polypropylene, polypropylene, high-density polyethylene, nylon material, hardened plastic, polymer, rubber, composite material, metal or metal alloy, etc., carbon fiber, fiberglass, or other similar or equivalent materials.

Figure 9:
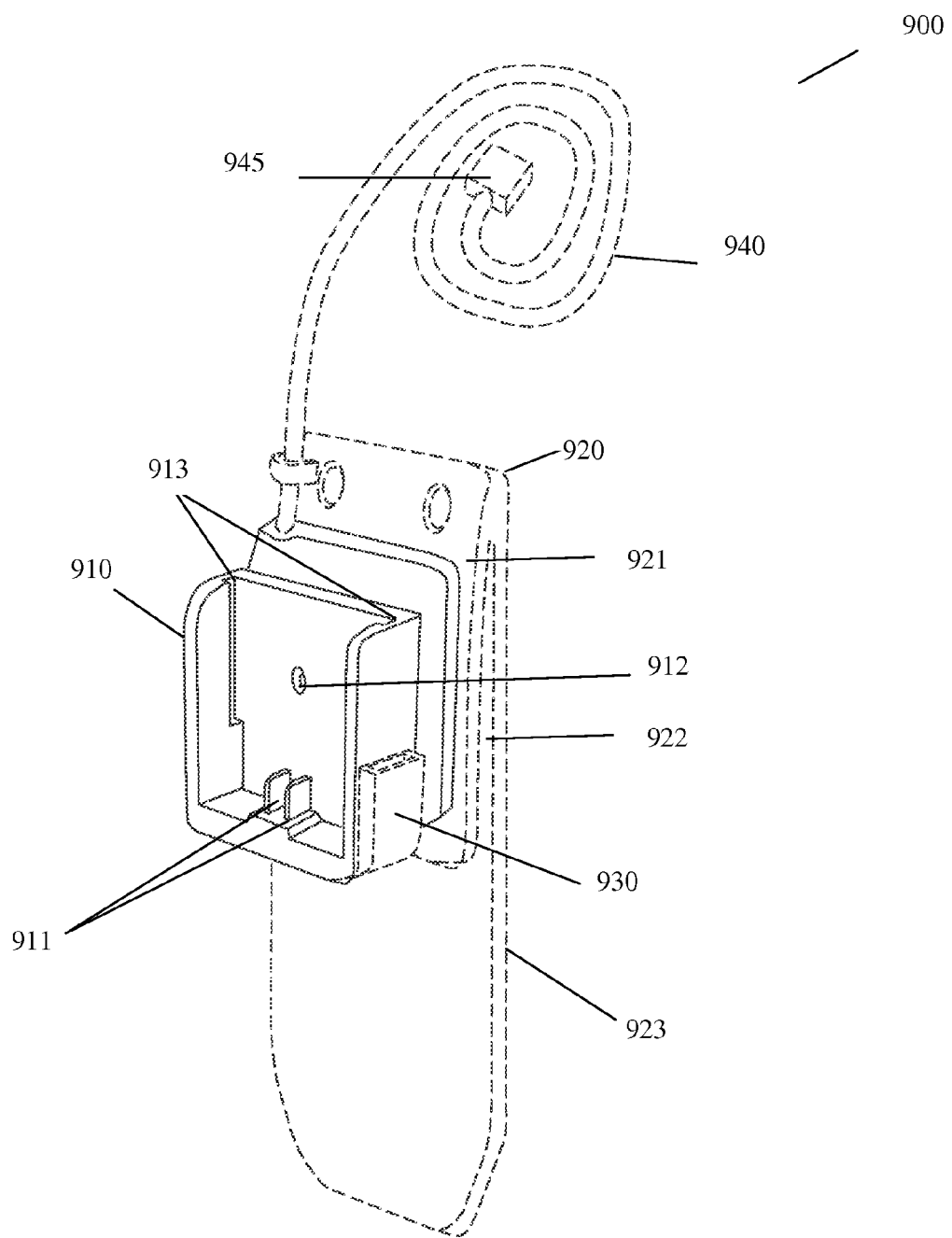
FIG. 9 illustrates a perspective view of a receptacle/adapter for a battery pack configured for accepting different multiple battery pack adapters according to one embodiment.

FIG. 9 illustrates a perspective view 900 of a (stand-alone) battery pack receptacle/adapter 910 for a cordless device battery pack (e.g., battery pack 1410, FIG. 15, battery pack 1810, FIG. 18, etc.) configured for accepting multiple battery pack adapters (e.g., adapters 1110, 1120, 1130, 1140, FIG. 11) according to one embodiment. In one embodiment, the battery pack receptacle/adapter 910 may include one or more USB connection ports (connector(s)) 930 (e.g., male or female connector(s)) for connecting to one or more USB devices (e.g., a cell/smart phone, music player, camera, lighting element, computing device, wearable smart device, etc.). In one embodiment, the battery pack receptacle/adapter 910 includes a USB cord 940 having a length (e.g., 1 foot, two feet, three feet, six feet, etc.) and including a USB port (or connector) 945 at the end (e.g., male or female). In one embodiment, the length of the USB cord 940 may comprise any desirable length and may be based on implementation (e.g., 6 in.-6 ft., etc.). In one embodiment, the battery pack receptacle/adapter 910 may have more than one USB connection ports 930 that are integrated with the battery pack receptacle/adapter 910. In one embodiment, the battery pack receptacle/adapter 910 may include a cord winding portion to wind the cord 940. In some embodiments, the cord 940 is optional and may or may not be included with the battery pack receptacle/adapter 910. In one embodiment, the cord 940 is removably or permanently coupled to the battery pack receptacle/adapter 910.

In one embodiment, the battery pack receptacle/adapter 910 may be either permanently connected to or removably connected to an attachment portion 920 (e.g., a slide-over coupler, a clamp-type coupler, spring-type coupler, hook and loop fasteners, clips, rotatable couplers, placed in a pocket or sleeve, etc.) for either permanently or removably attaching the battery pack receptacle/adapter 910 to a utility bag, platform, bag apparatus, housing or other device. In one embodiment, the battery pack receptacle/adapter 910 may include a channel or cut-out portion for passing the cord 940. In one embodiment, the battery pack receptacle/adapter 910 includes retaining, guide channels or grooves 913 in a receptacle/adapter body of the battery pack receptacle/adapter 910 for coupling with a rear portion of a battery pack adapter (e.g., adapters 1110, 1120, 1130, 1140, FIG. 11). In one embodiment, the battery pack receptacle/adapter 910 includes an optional through-hole for fastening a battery pack adapter (e.g., adapters 1110, 1120, 1130, 1140, FIG. 11) to the battery pack receptacle/adapter 910. In one embodiment, the fastening means may include a screw, nut/bolt, socket-type fastener, etc. In one embodiment, the battery pack receptacle/adapter 910 includes battery pack adapter electrical connectors 911 for electrically connecting to a battery pack adapter (e.g., adapters 1110, 1120, 1130, 1140, FIG. 11) for transferring voltage/power from a battery pack through the adapter, to the battery pack receptacle/adapter 910 and to the USB port 945 and/or one or more USB connection ports 930 for powering electronic devices using a USB connection for power.

In one embodiment, the battery pack receptacle/adapter 910 includes two (2) electrical connectors 911. In other embodiments, other numbers of connections for the housing electrical connectors may be used (e.g., 4, 6, etc.). In one embodiment, the number of electrical connectors 911 matches the number of associated battery pack adapter electrical connectors (e.g., contacts 2111, FIG. 21) for the adapter (s) being used (e.g., adapters 1110, 1120, 1130, 1140, FIG. 11).

Figure 10:
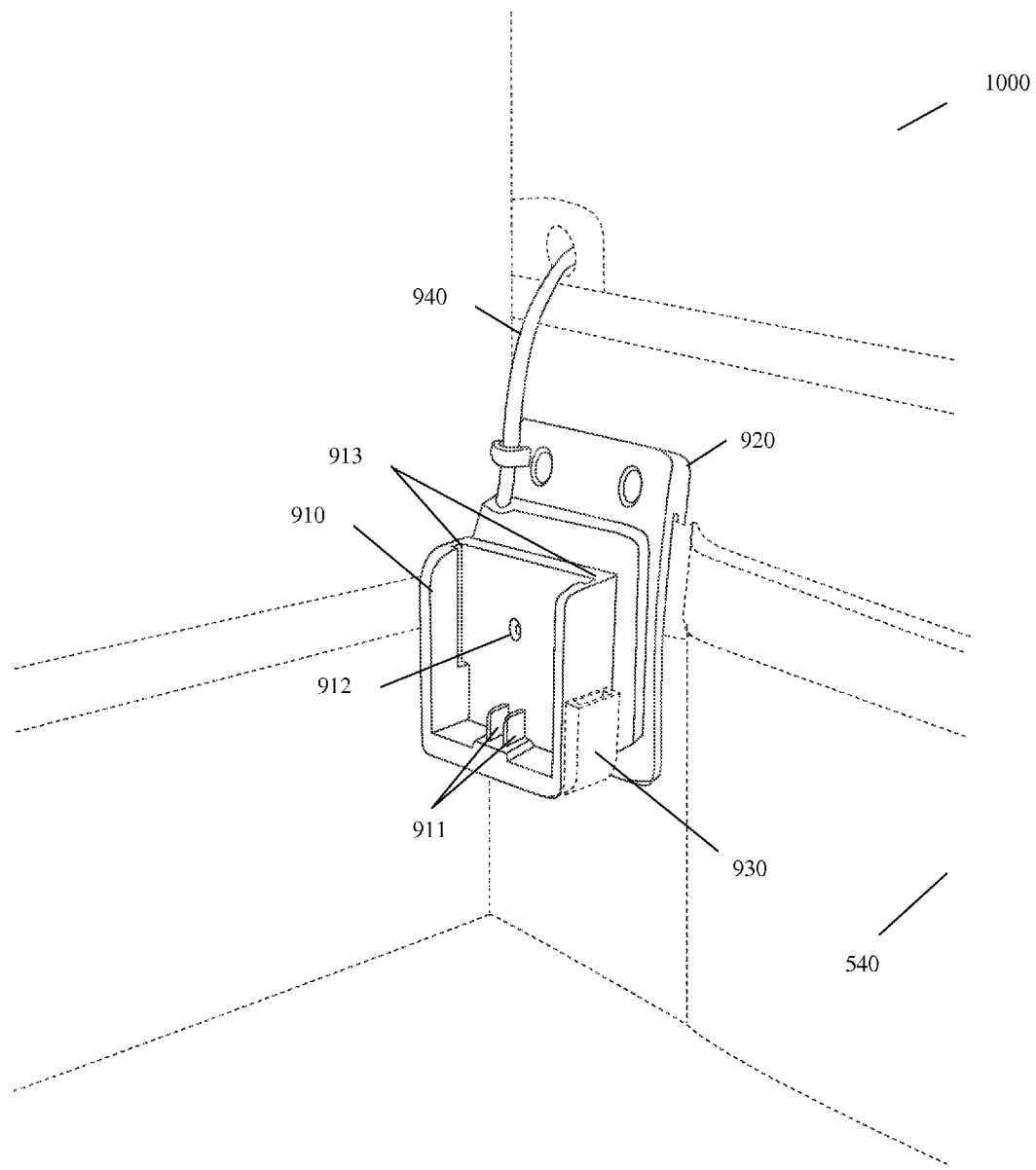
FIG. 10 illustrates a perspective view of the receptacle/adapter for a battery pack configured for accepting different multiple battery pack adapters, showing an example implementation with a utility bag or other device according to one embodiment.

FIG. 10 illustrates a perspective view 1000 of the battery pack receptacle/adapter 910 for a cordless device battery pack configured for accepting multiple battery pack adapters (e.g., adapters 1110, 1120, 1130, 1140, FIG. 11) showing an example implementation with a utility bag 540 (or other device, housing, bag apparatus, platform, etc.) according to one embodiment. In one embodiment, the battery pack receptacle/adapter 910 includes an attachment device 920 including a front coupling portion 921 (FIG. 9) and a rear coupling portion 923 (FIG. 9). In one embodiment, a gap 922 (FIG. 9) between the front coupling portion 921 and the rear coupling portion 923 may be fitted over non-rigid or semi-rigid material of a pocket, sleeve, bag apparatus, a utility bag or other device, placed over a rigid material of a device for placement of the battery pack receptacle/adapter 910. In one embodiment, the USB cord 940 may be fitted into a conduit, tunnel, groove, etc. of utility bags, bag apparatus, housings, cases, boxes, coolers, clothing, etc. In one embodiment, the rear coupling portion has a length equal to, less than, or greater than the front coupling portion.

In one embodiment, the battery pack receptacle/adapter 910 may be positioned in a pocket, clipped to a pocket or sleeve, part of a pocket, positioned inside a utility bag, part of a wall of a bag apparatus, utility bag, placed in a compartment, etc. (e.g., a side-wall, an end-wall, etc.), container, case, box, cooler, etc. as desired. In one embodiment, the battery pack receptacle/adapter 910 includes a USB cord guide element (e.g., a loop, open loop, removable portion of a loop, etc.) that may be placed around or over the USB cord 940 for maintaining the USB cord 940 in a desired position. It should be noted that other above-mentioned attachment devices/elements may be used other than the depicted attachment device 920 for coupling (removably, permanently, etc.) the battery pack receptacle/adapter 910 to a device, housing or platform.

Figure 11:
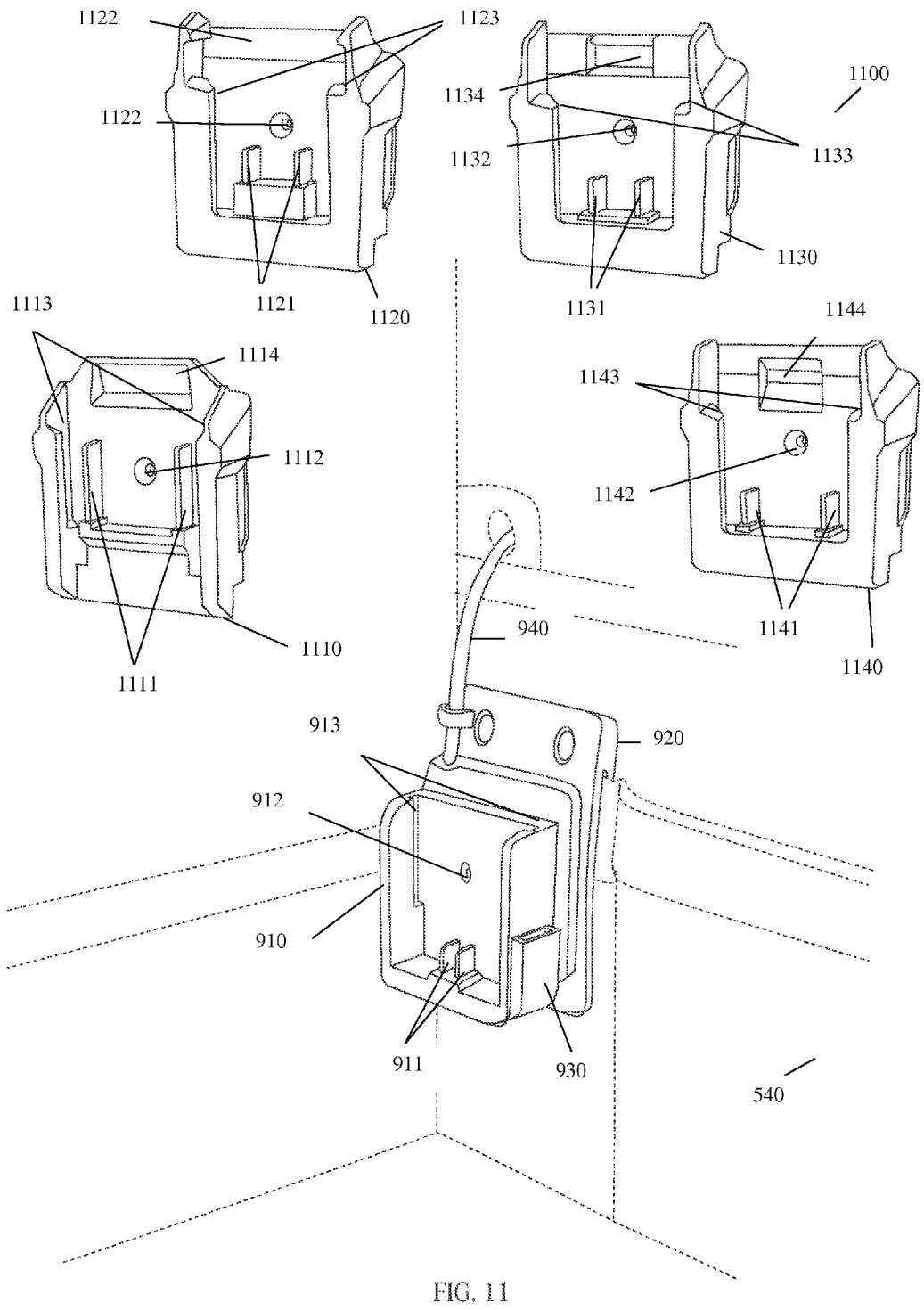
FIG. 11 illustrates a perspective view of the receptacle/adapter for a battery pack configured for accepting different multiple battery pack adapters showing an example implementation with a utility bag or other device, and showing multiple battery pack adapters according to one embodiment.

FIG. 11 illustrates a perspective view 1100 of the battery pack receptacle/adapter 910 for a cordless device battery pack configured for accepting multiple battery pack adapters 1110, 1120, 1130, and 1140, showing an example implementation with a utility bag 540 (or other device, housing, bag apparatus, platform, etc.) according to one embodiment. In one embodiment, each of the battery pack adapters 1110, 1120, 1130, and 1140 are distinct from one another in that each of the battery pack adapters 1110, 1120, 1130, and 1140 are configured for distinct cordless battery packs (e.g., different manufacturers, different brands, etc.). That is, many different brands of cordless device s that use battery packs to power the cordless devices are made so that they will not fit or work with battery chargers or the cordless devices from other brands. Therefore, if a user has cordless tools from different manufacturers, they need to use different battery chargers and different batteries for the different brand cordless tools. In one embodiment, if a user of a cordless device desired to use the battery pack receptacle/adapter 910, an appropriate adapter is selected from the adapters 1110, 1120, 1130, and 1140 for the particular brand of cordless battery pack.

In one embodiment, the adapter 1110 includes metal electrical connections 1111 for connecting to a first specific brand of battery pack, the adapter 1120 includes electrical connections 1121 for connecting to a second specific brand of battery pack, the adapter 1130 includes electrical connections 1131 for connecting to a third specific brand of battery pack, and the adapter 1140 includes electrical connections 1141 for connecting to a fourth specific brand of battery pack. In one embodiment, the electrical connections from the adapter (e.g., electrical contacts 1111, 1121, 1131, or 1141) contact the electrical connectors 911 of the battery pack receptacle/adapter 910 via the contacts 2111 (FIG. 21) when the adapter is inserted into the battery pack receptacle/adapter 910 for passing voltage from a battery pack that is inserted within the adapter to the USB cord 940 to the USB port/connector 945 and/or other USB ports/connectors (e.g., one or more USB connector(s)/port(s) 930).

In one embodiment, adapter 1110 includes a through-hole 1112 that aligns with the through-hole 912 of the battery pack receptacle/adapter 910 for placing a fastener through the through-holes 1112 and 912 for fixing the adapter 1110 to the battery pack receptacle/adapter 910. In one embodiment, adapter 1120 includes a through-hole 1122 that aligns with the through-hole 912 of the battery pack receptacle/adapter 910 for placing a fastener through the through-holes 1122 and 912 for fixing the adapter 1120 to the battery pack receptacle/ adapter 910. In one embodiment, adapter 1130 includes a through-hole 1132 that aligns with the through-hole 912 of the battery pack receptacle/adapter 910 for placing a fastener through the through-holes 1132 and 912 for fixing the adapter 1130 to the battery pack receptacle/adapter 910. In one embodiment, adapter 1140 includes a through-hole 1142 that aligns with the through-hole 912 of the battery pack receptacle/adapter 910 for placing a fastener through the through-holes 1142 and 912 for fixing the adapter 1140 to the battery pack receptacle/adapter 910.

In one embodiment, adapter 1110 includes retaining portions 1113 and 1114 for holding/placement an associated battery back for a cordless device within the adapter. In one embodiment, the retaining portions 1113 and 1114 of the adapter 1110 provide similar placement support as if the associated battery pack is being placed in an associated charging device (i.e., a charging device configure for the specific battery pack). In one embodiment, adapter 1120 includes retaining portions 1123 and 1122 for holding/placement an associated battery back for a cordless device within the adapter. In one embodiment, the retaining portions 1123 and 1124 of the adapter 1120 provide similar placement support as if the associated battery pack is being placed in an associated charging device (i.e., a charging device configure for the specific battery pack). In one embodiment, adapter 1130 includes retaining portions 1133 and 1134 for holding/placement an associated battery back for a cordless power tool device within the adapter. In one embodiment, the retaining portions 1133 and 1134 of the adapter 1130 provide similar placement support as if the associated battery pack is being placed in an associated charging device (i.e., a charging device configure for the specific battery pack). In one embodiment, adapter 1140 includes retaining portions 1143 and 1144 for holding/placement an associated battery back for a cordless device within the adapter. In one embodiment, the retaining portions 1143 and 1144 of the adapter 1140 provide similar placement support as if the associated battery pack is being placed in an associated charging device (i.e., a charging device configure for the specific battery pack).

In one embodiment, the adapters 1110, 1120, 1130, and 1140 may include an indicator for informing a user of the specific brand that the adapter is configured to work with. In one embodiment, the indicator may include a letter, a number, a color, a name, etc. In another embodiment, the adapters 1110, 1120, 1130, and 1140 and the battery pack receptacle/adapter 910 may include an integrated circuit (IC) that includes a speaker and processor to provide recorded speech or synthetic speech indicating the brand when the adapter is placed in the battery pack receptacle/adapter 910. In other embodiments, a light indicator (e.g., an LED) may illuminate when an adapter is placed in the battery pack receptacle/adapter 910 to indicate a position for a particular brand that the adapter is configured to accept battery pack coupling with. In the simplest form, in one embodiment, the adapters may be visually matched to the particular brand of battery pack that they are configured to work with based on the electrical connector configuration, congruent fitment of the electrical contact side of the battery pack with the electrical contact side of the adapter, etc.

In one embodiment, the adapters 1110, 1120, 1130, and 1140 while having specific electrical connections (e.g., number of electrical connections, spacing and placement of the electrical connections, shape and form of the adapter body for congruent fitment of the associated battery pack, height and shape of electrical connections, etc.) for the associated brand of battery pack (e.g., electrical battery pack connectors 1111 for adapter 1110, electrical battery pack connectors 1121 for adapter 1120, electrical battery pack connectors 1131 for adapter 1130, and electrical battery pack connectors 1141 for adapter 1140), the battery pack receptacle/adapter 910 electrical connections 911 remain the same for each adapter. In one embodiment, the bottom portion of each adapter 1110, 1120, 1130, and 1140 includes electrical contacts 2111 (FIG. 21) for electrically connecting the adapters 1110, 1120, 1130, and 1140 with the electrical connectors 911 of the battery pack receptacle/adapter 910.

Figure 12:
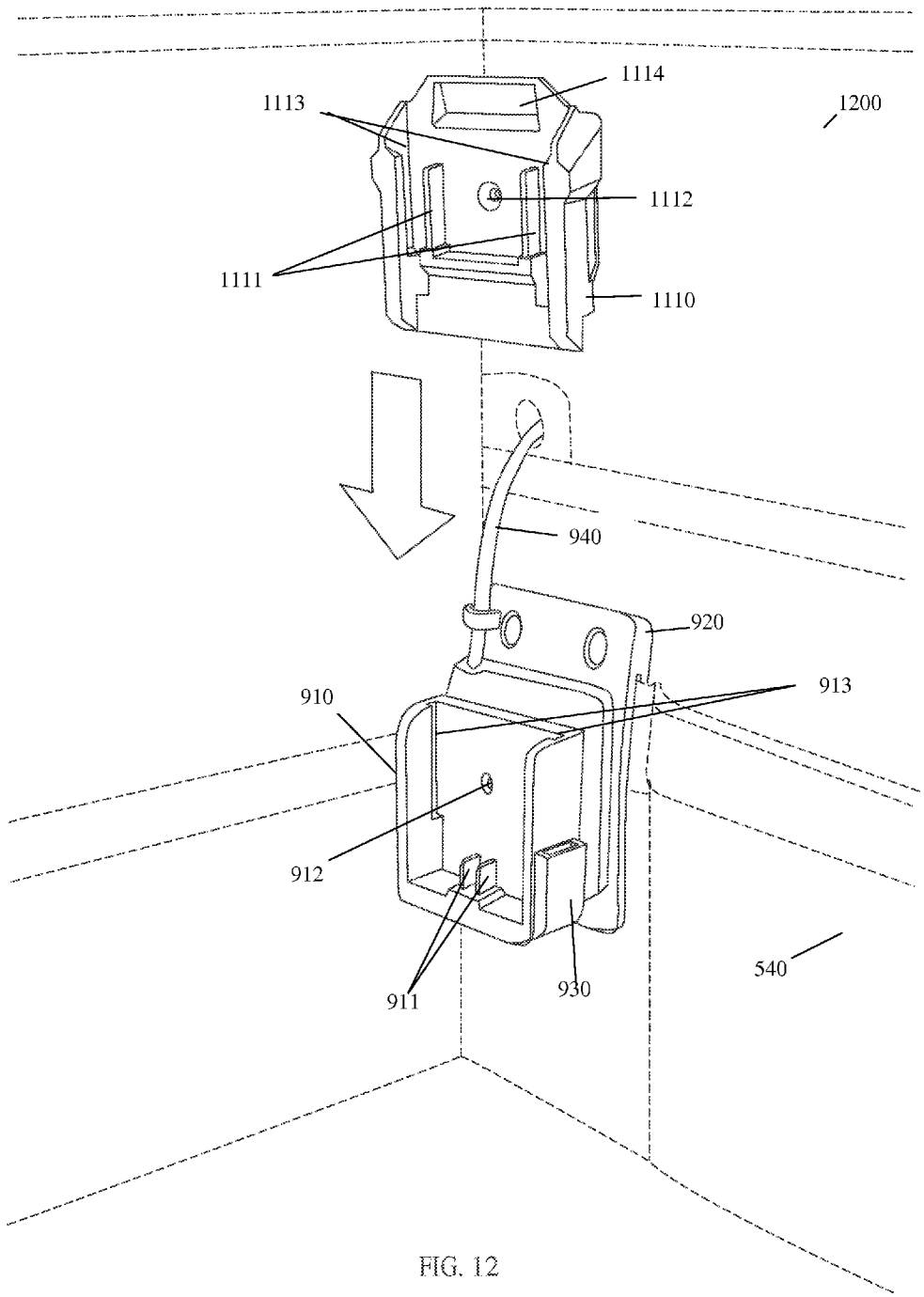
FIG. 12 illustrates a perspective view of the receptacle/adapter for a battery pack configured for accepting different multiple battery pack adapters showing an example implementation with a utility bag or other device and showing an example battery pack adapter to be inserted into the receptacle/adapter according to one embodiment.

FIG. 12 illustrates a perspective view 1200 of the battery pack receptacle/adapter 910 for a battery pack configured for accepting multiple battery pack adapters (e.g., adapters 1110, 1120, 1130, and 1140) showing an example implementation with a utility bag 540 (or other device, bag apparatus, housing, platform, etc.) and showing an example battery pack adapter 1110 to be inserted into the battery pack receptacle/adapter 910 in the direction of the arrow according to one embodiment. In one embodiment, the adapter 1110 is moved in the direction of the arrow so that the guide elements/portions 1143 are slid/placed into the retaining channels or grooves 913, which aligns the adapter 1110 with the battery pack receptacle/adapter 910 so that the electrical contacts 2111 align properly with the battery pack adapter electrical connectors 911 for the circuitry continuity.

Figure 13:
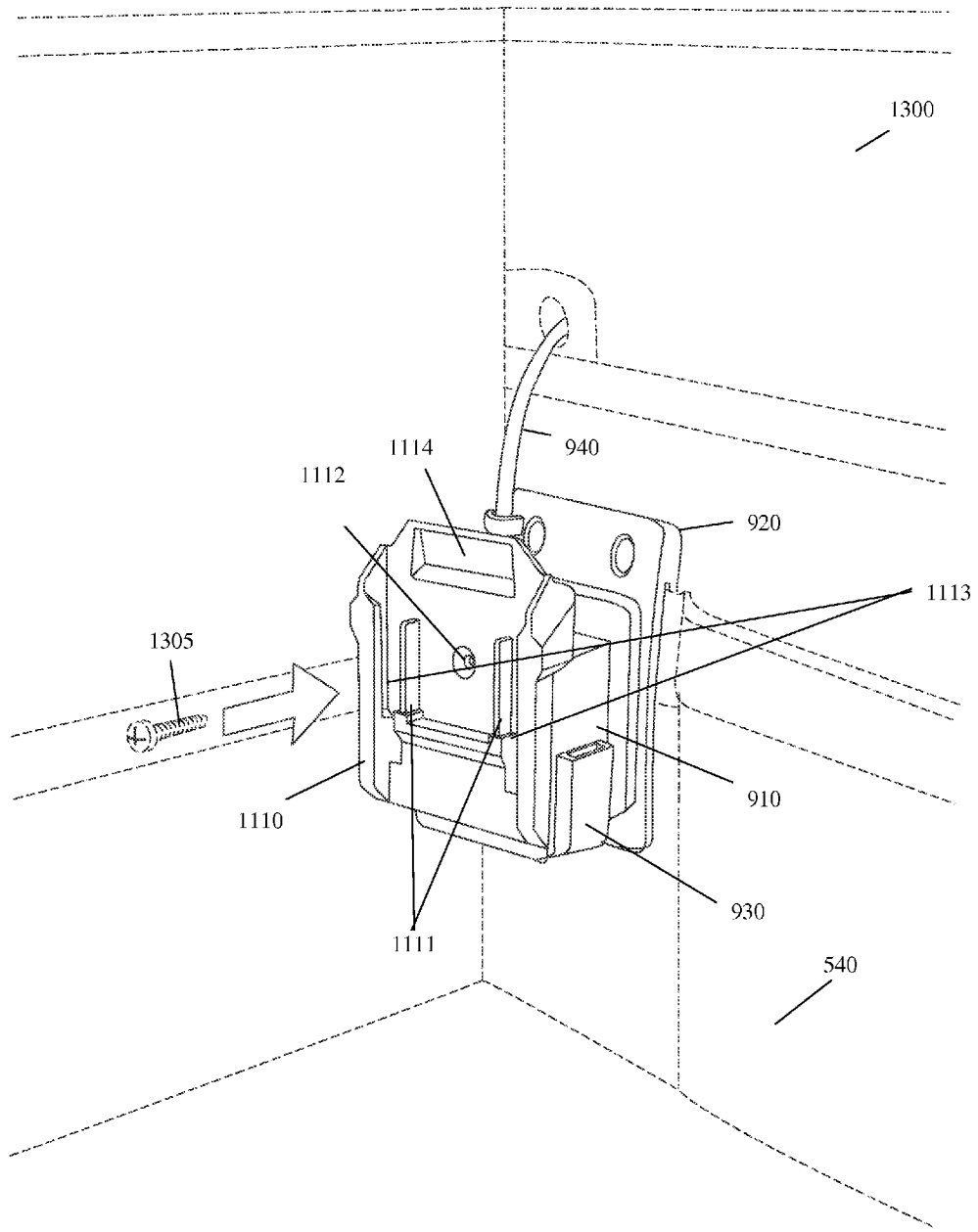
FIG. 13 illustrates a perspective view of the receptacle/adapter for a battery pack configured for accepting different multiple battery pack adapters showing an example implementation with a utility bag or other device and showing an example battery pack adapter inserted into the receptacle/adapter according to one embodiment.

FIG. 13 illustrates a perspective view 1300 of the battery pack receptacle/adapter 910 for a cordless device battery pack configured for accepting multiple battery pack adapters (e.g., adapters 1110, 1120, 1130, and 1140) showing an example implementation with a utility bag 540 (or other device, bag apparatus, housing, platform, etc.) and showing the example battery pack adapter 1110 inserted into the battery pack receptacle/adapter 910 according to one embodiment. In one example, the fastener 1305 may be inserted in the direction of the arrow through the through-hole 1112 for fastening the adapter 1110 to the battery pack receptacle/adapter 910 (e.g., when a user is only using or planning on using a single adapter for a particular brand of battery pack, to prevent dislodgement, etc.).

Figure 14:
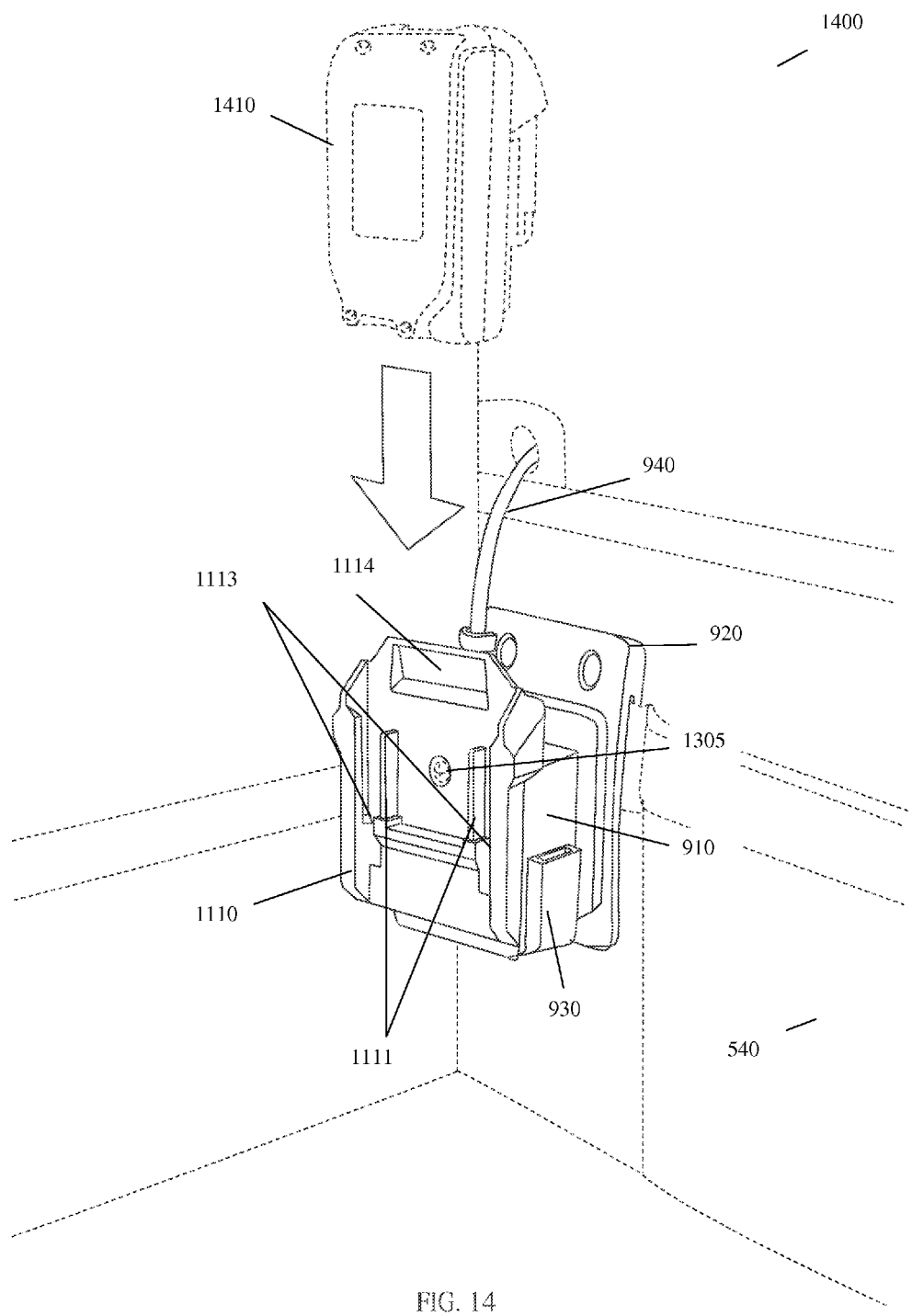
FIG. 14 illustrates a perspective view of the receptacle/adapter shown in FIG. 13 showing an example implementation with an example battery pack being inserted into the example battery pack adapter according to one embodiment.

FIG. 14 illustrates a perspective view 1400 of the battery pack receptacle/adapter 910 showing an example implementation with an example battery pack 1410 being inserted into the example battery pack adapter 1110 in the direction of the arrow according to one embodiment. In one embodiment, the battery pack 1410 is inserted/slid into the adapter 1110 so that the electrical contact portions of the battery pack 1410 is guided into contact with the electrical connections 1111 by aligning the rear portion of the battery pack 1410 within the retaining portions 1113.

Figure 15:
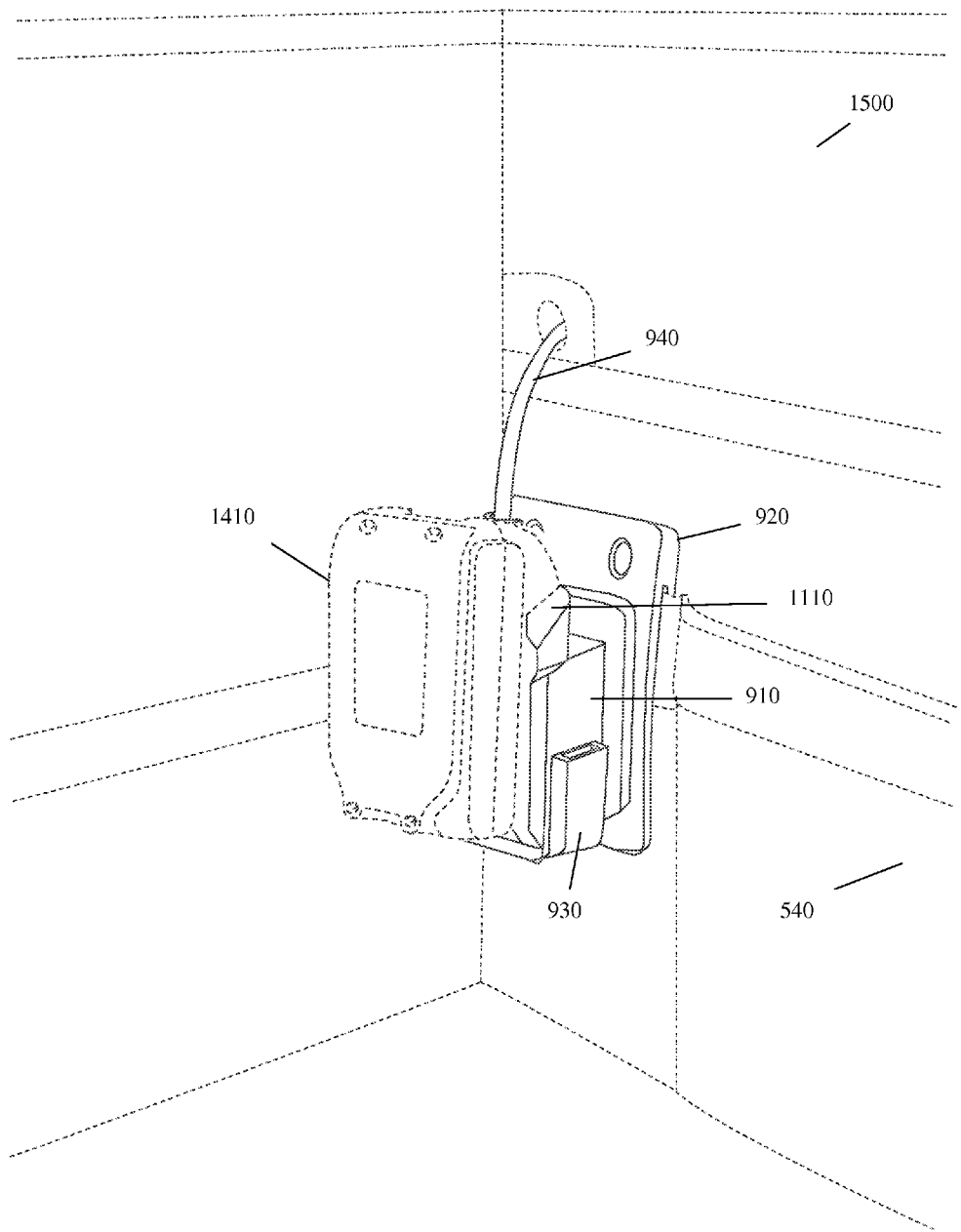
FIG. 15 illustrates a perspective view of the receptacle/adapter shown in FIG. 14 showing the example battery pack inserted into the example battery pack adapter according to one embodiment.

FIG. 15 illustrates a perspective view 1500 of the battery pack receptacle/adapter 910 showing the example battery pack 1410 inserted into the example battery pack adapter 1110 that is connected with the battery pack receptacle/adapter 910, according to one embodiment. In one embodiment, the battery pack receptacle/adapter 910 begins to receive the voltage or power from the battery pack 1410 upon insertion into the adapter 1110 that is connected to the battery pack receptacle/adapter 910. In another embodiment, the battery pack receptacle/adapter 910 or the adapter 1110 includes a switch to either electrically connect or disconnect the battery pack 1410 from the battery pack receptacle/adapter 910. In one embodiment, when the battery pack 1410 is supplying power to the battery pack receptacle/adapter 910, an indicator light (e.g., an LED) is illuminated as an indication.

Figure 16:
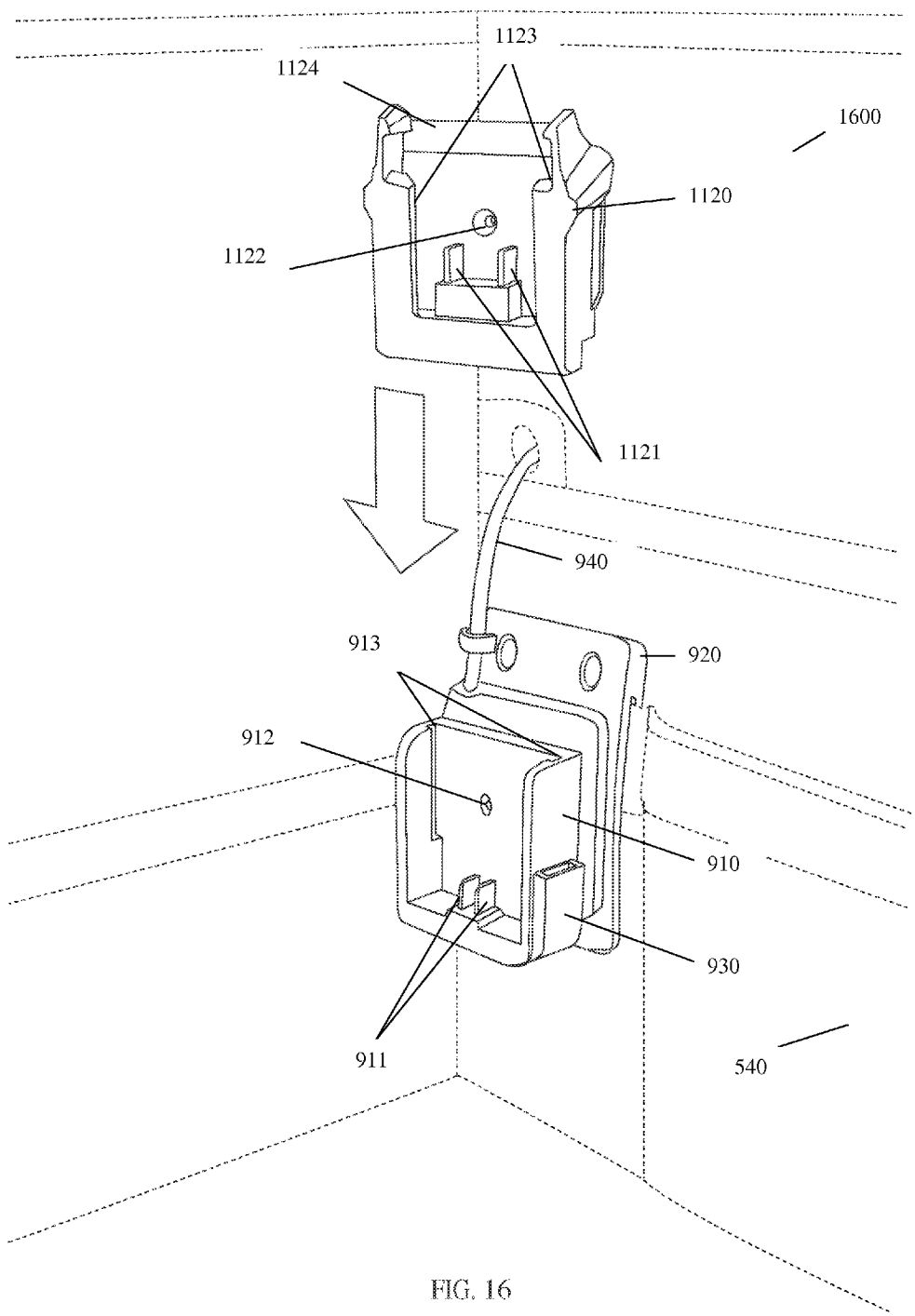
FIG. 16 illustrates a perspective view of the receptacle/adapter for a battery pack configured for accepting different multiple battery pack adapters showing an example implementation with a utility bag and showing another example battery pack adapter to be inserted into the receptacle/adapter according to one embodiment.

FIG. 16 illustrates a perspective view 1600 of the battery pack receptacle/adapter 910 for a battery pack configured for accepting multiple battery pack adapters (e.g., adapters 1110, 1120, 1130, and 1140) showing an example implementation with a utility bag 540 (or other device, bag apparatus, housing, platform, etc.) and showing an example battery pack adapter 1120 to be inserted into the battery pack receptacle/adapter 910 in the direction of the arrow according to one embodiment. In one embodiment, the adapter 1120 is moved in the direction of the arrow so that the guide portions 1143 are slid/placed into the retaining channels or grooves 913, which aligns the adapter 1120 with the battery pack receptacle/adapter 910 so that the electrical contacts 2111 align properly with the battery pack adapter electrical connectors 911 for the circuitry continuity.

Figure 17:
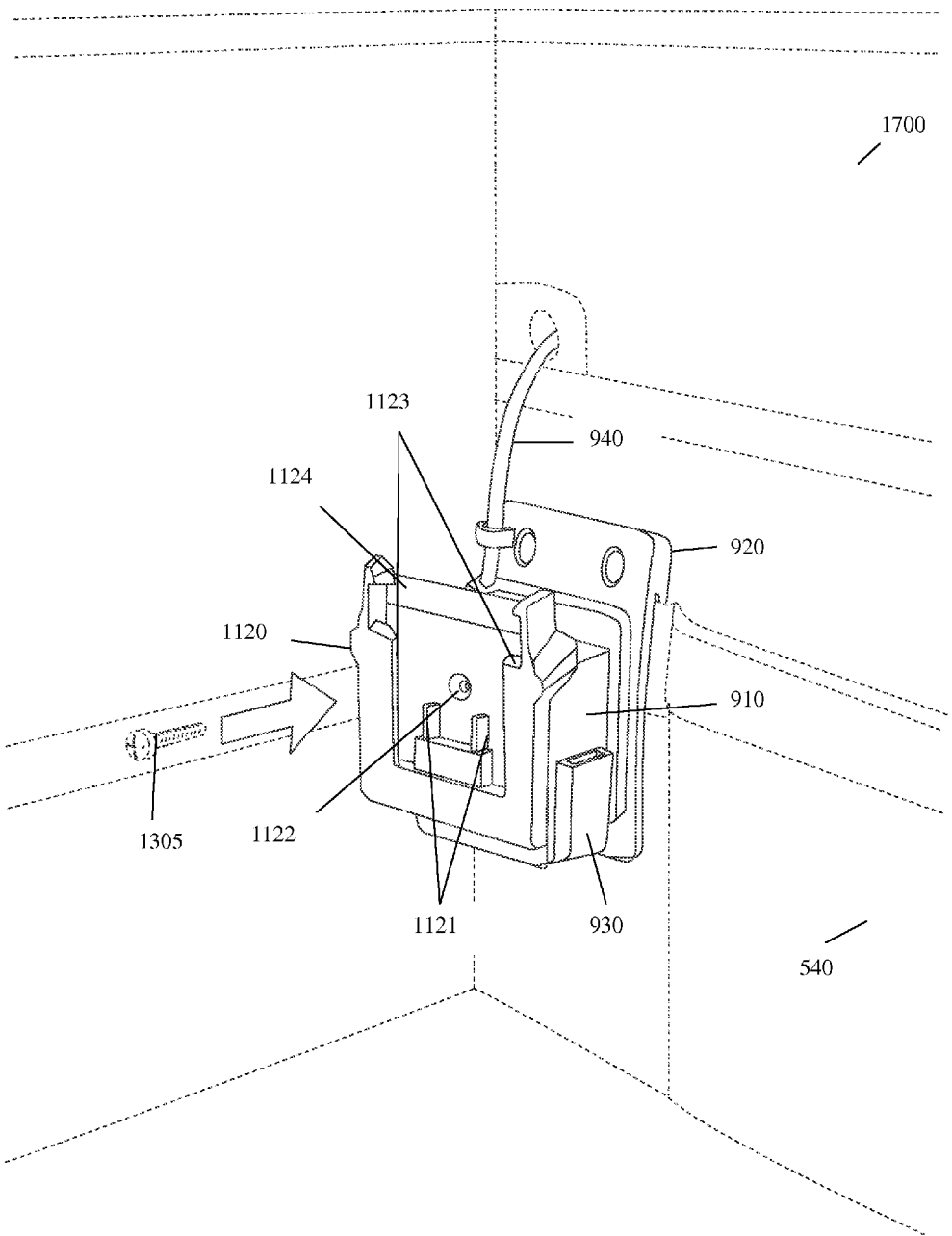
FIG. 17 illustrates a perspective view of the receptacle/adapter for a battery pack configured for accepting different multiple battery pack adapters showing the example battery pack adapter inserted into the receptacle/adapter according to one embodiment.

FIG. 17 illustrates a perspective view 1700 of the battery pack receptacle/adapter 910 for a cordless device battery pack configured for accepting multiple battery pack adapters (e.g., adapters 1110, 1120, 1130, and 1140) showing an example implementation with a utility bag 540 (or other device, bag apparatus, housing, platform, etc.) and showing the example battery pack adapter 1120 inserted into the battery pack receptacle/adapter 910 according to one embodiment. In one example, the fastener 1305 may be inserted in the direction of the arrow through the through-hole 1122 for fastening the adapter 1120 to the battery pack receptacle/adapter 910 (e.g., when a user is only using or planning on using a single adapter for a particular brand of battery pack, to prevent dislodgement, etc.).

Figure 18:
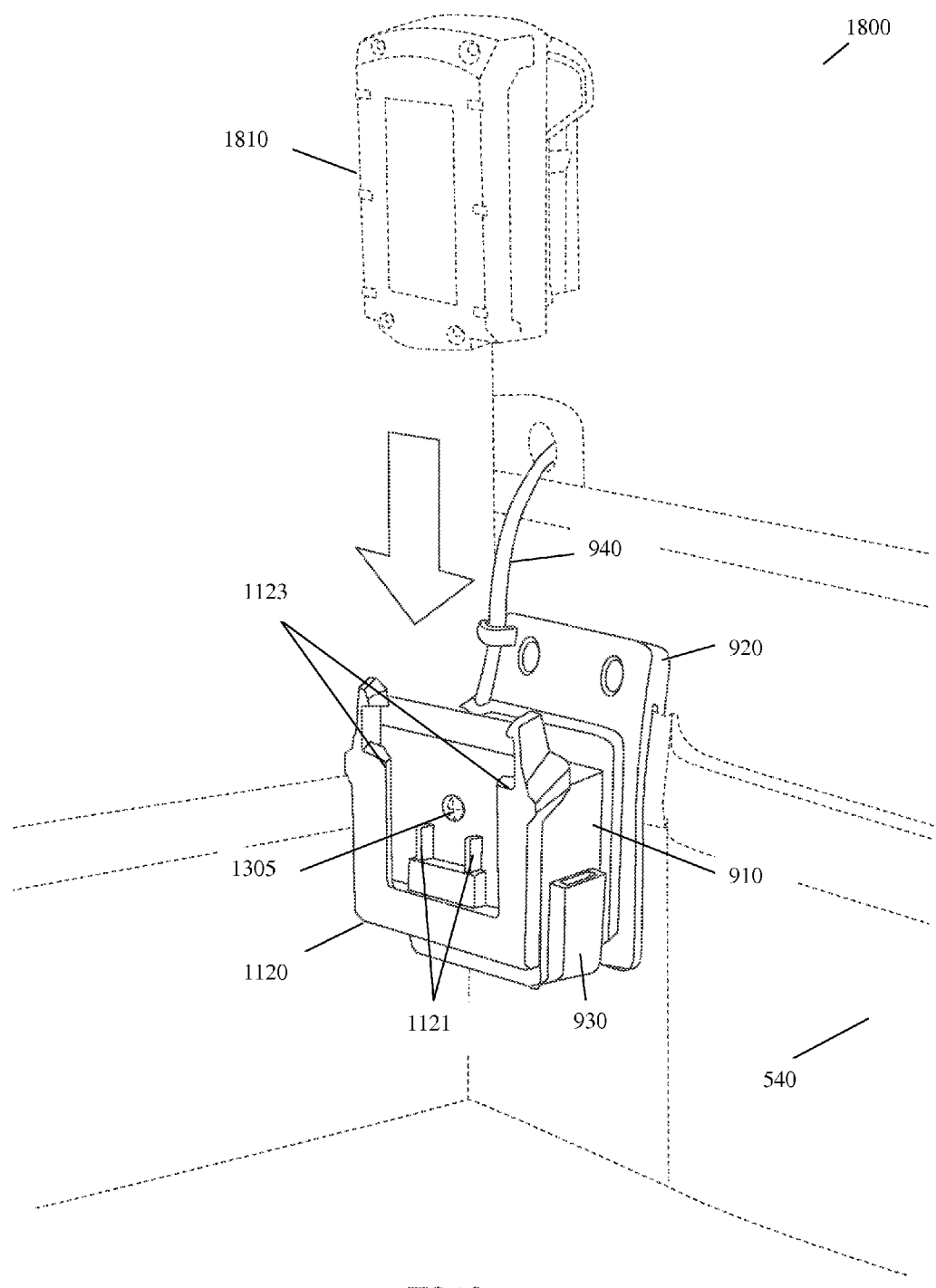
FIG. 18 illustrates a perspective view of the receptacle/adapter shown in FIG. 17 showing an example battery pack being inserted into the example battery pack adapter according to one embodiment.

FIG. 18 illustrates a perspective view 1800 of the battery pack receptacle/adapter 910 showing an example implementation with an example battery pack 1810 (for an associated brand of cordless tools) being inserted into the example battery pack adapter 1120 (configured to electrically connect with the battery pack 1810) in the direction of the arrow according to one embodiment. In one embodiment, the battery pack 1810 is inserted/slid into the adapter 1120 so that the electrical contact portions of the battery pack 1810 is guided into contact with the electrical connections 1121 by aligning the rear portion of the battery pack 1810 within the retaining portions 1123.

Figure 19:
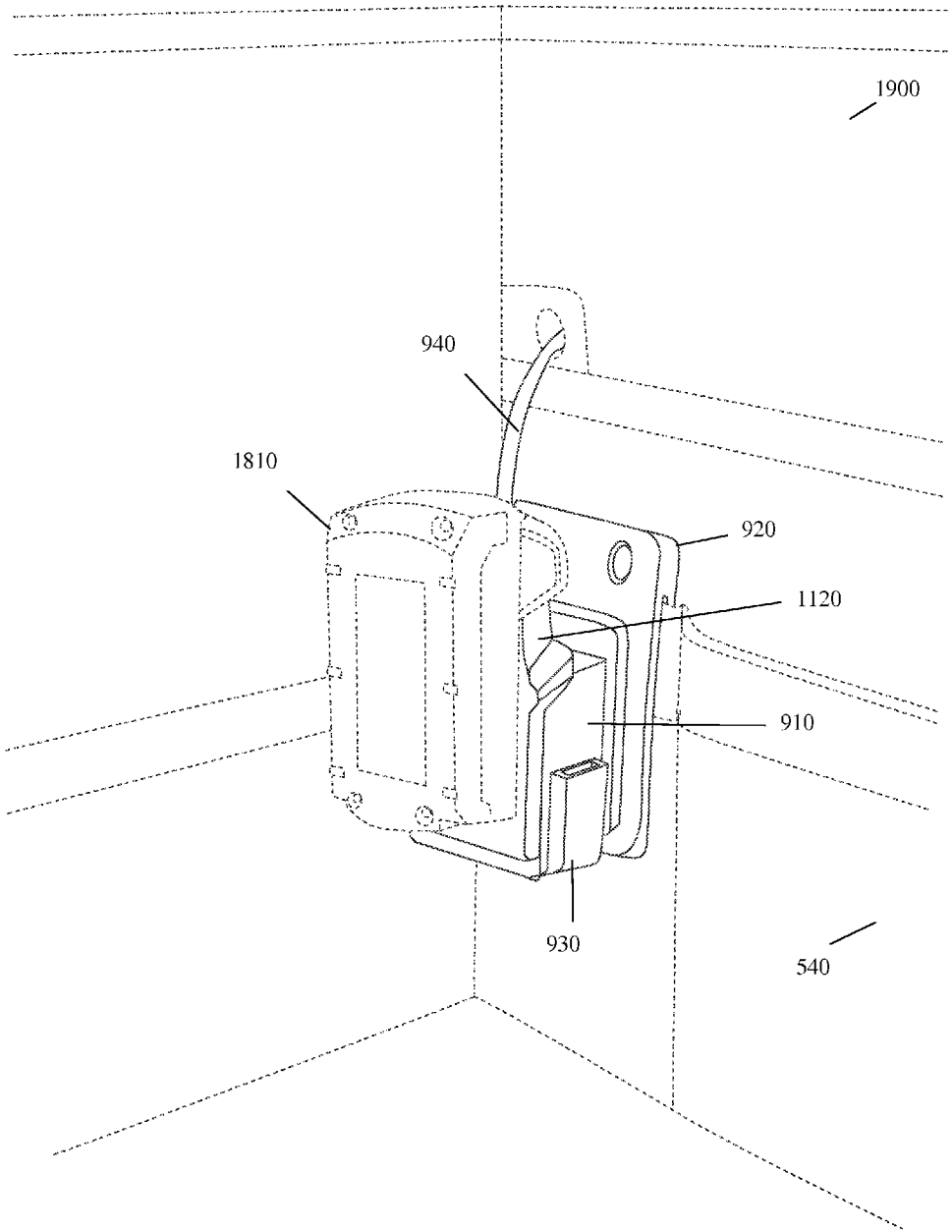
FIG. 19 illustrates a perspective view of the receptacle/adapter shown in FIG. 17 showing an example battery pack inserted into the example battery pack adapter according to one embodiment.

FIG. 19 illustrates a perspective view 1900 of the battery pack receptacle/adapter 910 showing the example battery pack 1810 inserted into the example battery pack adapter 1120 that is connected with the battery pack receptacle/adapter 910, according to one embodiment. In one embodiment, the battery pack receptacle/adapter 910 begins to receive the voltage or power from the battery pack 1810 upon insertion into the adapter 1120 that is connected to the battery pack receptacle/adapter 910. In another embodiment, the battery pack receptacle/adapter 910 or the adapter 1120 includes a switch to either electrically connect or disconnect the battery pack 1810 from the battery pack receptacle/adapter 910. In one embodiment, when the battery pack 1810 is supplying power to the battery pack receptacle/adapter 910, an indicator light (e.g., an LED) is illuminated as an indication.

Figure 20:
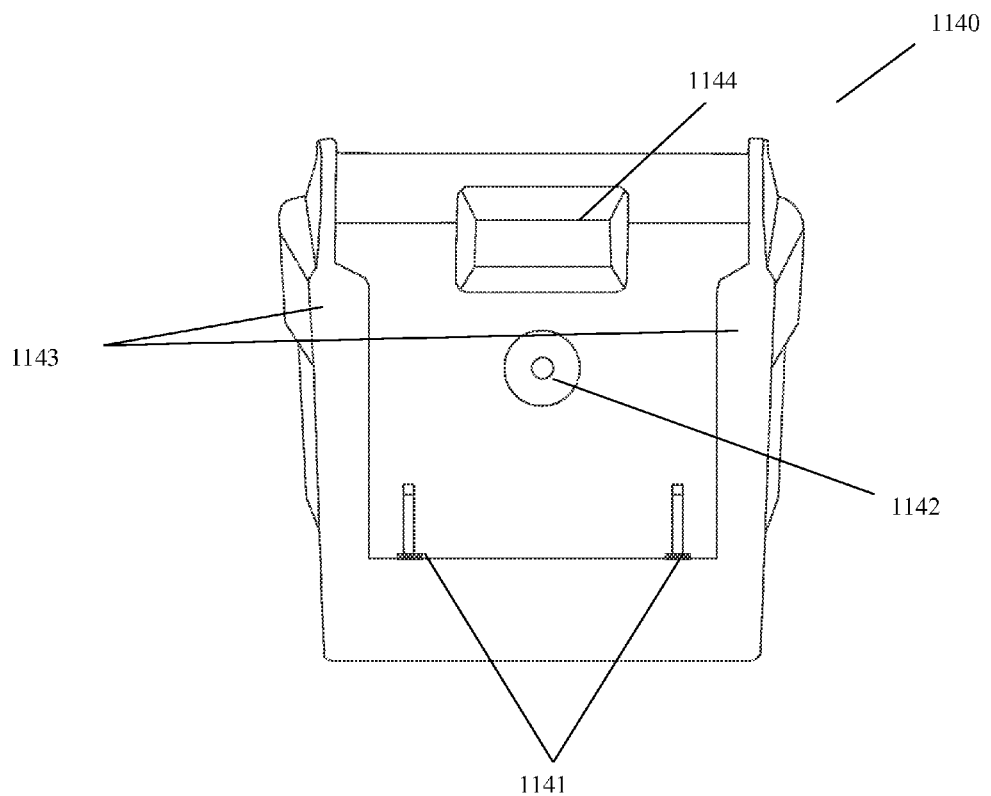
FIG. 20 illustrates a front view of an example battery pack adapter that is removably connected to a battery pack receptacle/adapter according to one embodiment.

FIG. 20 illustrates a front view of an example battery pack adapter 1140 that is removably connected to a battery pack receptacle/adapter 910 (FIG. 9) according to one embodiment. As shown, the retaining portions 1143 include left and right extensions that retain a battery pack for a cordless tool. The retaining portions 1143 also align the battery pack's electrical contacts with the electrical contacts 1141 for providing continuity from the battery pack to the adapter 1140.

Figure 21:
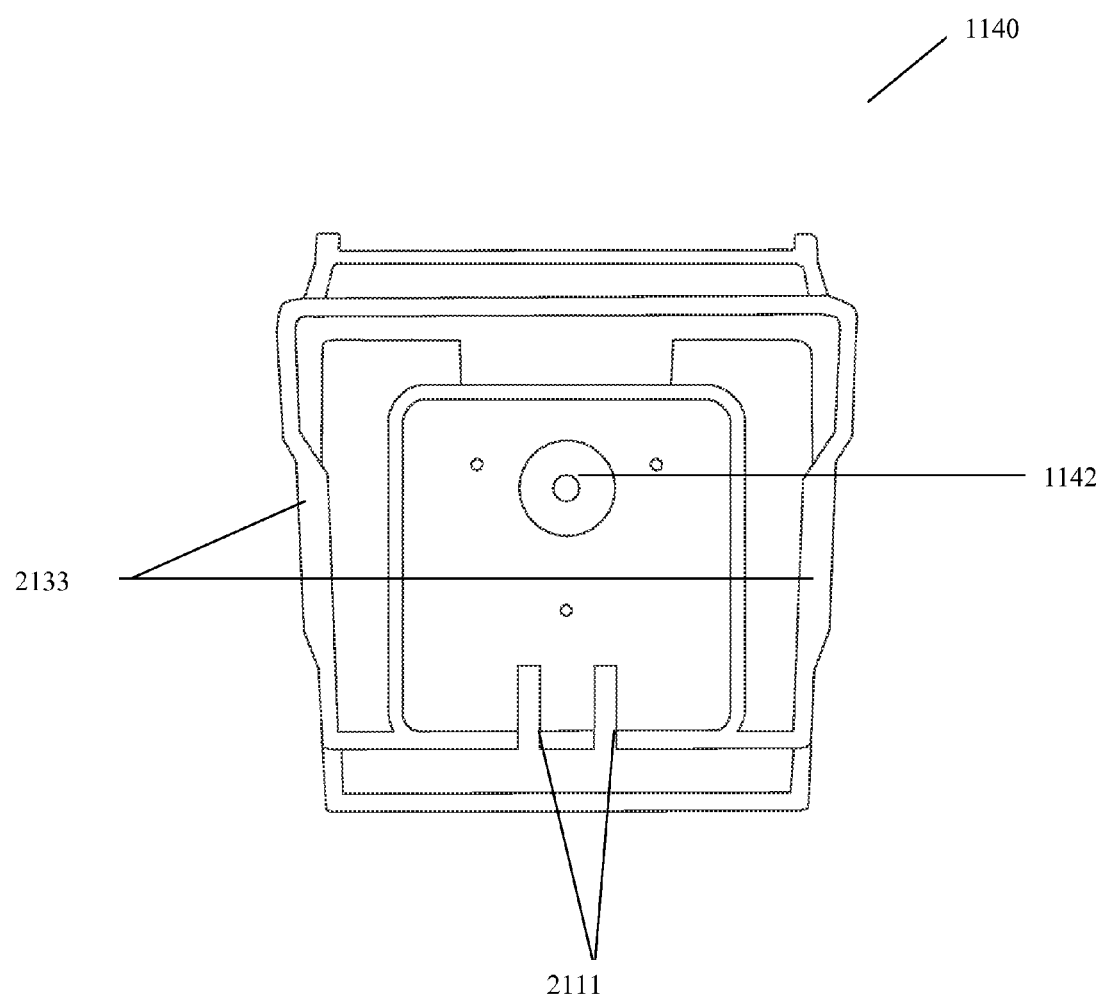
FIG. 21 illustrates a rear view of the example battery pack adapter shown in FIG. 20 that is removably connected to a battery pack receptacle/adapter according to one embodiment.

FIG. 21 illustrates a rear view of the example battery pack adapter 1140 shown in FIG. 20 that is removably connected to the battery pack receptacle/adapter 910 (FIG. 9) according to one embodiment. As shown, the guide portions 2133 are configured for fitment within the retaining channels or grooves 913 and are tapered towards the bottom of the battery pack receptacle/adapter 910. In one embodiment, the contacts 2111 are female connectors that receive the electrical connectors 911, which are configured as male connectors. In another embodiment, the contacts 2111 and electrical connectors 911 may be reversed such that the electrical connectors are female and the contacts 2111 are male.

Figure 22:
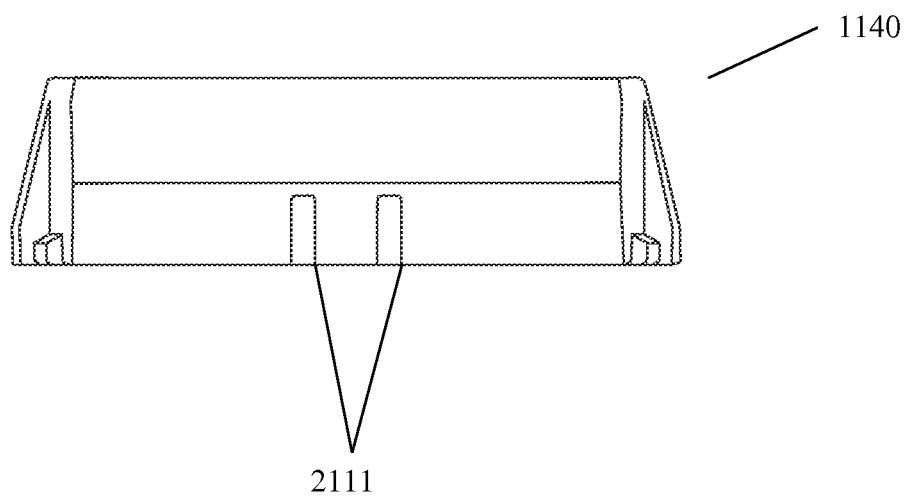
FIG. 22 illustrates a bottom view of the example battery pack adapter shown in FIG. 20 that is removably connected to a battery pack receptacle/adapter according to one embodiment.

FIG. 22 illustrates a bottom view of the example battery pack adapter 1140 that is removably connected to the battery pack receptacle/adapter 910 (FIG. 9) according to one embodiment. As shown, the contacts 2111 are located on the bottom of the adapter 1140 and are positioned for alignment with the electrical connectors 911 when the adapter 1140 is inserted into the battery pack receptacle/adapter 910.

One or more embodiments are not limited to four manufacturer or brands of cordless device battery packs for using the adapters 1110, 1120, 1130 and 1140 to transfer power from the cordless device battery packs to a USB connector/port. Other adapters (not shown) for any other manufacturers or brand of cordless device battery packs (including different electrical contact and housing configurations) may be implemented by embodiments in order to provide for conversion of cordless device battery pack power to USB delivered power or voltage. In one or more embodiments, a user that may need to power or charge a USB device may use a cordless device battery pack to do so when it may not be possible or is inconvenient to power or charge a USB device depending on the circumstances (e.g., no electricity, distance from a connection, forgot to bring a USB cord or charger for a USB device, etc.).

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

In the description above, numerous specific details are set forth. However, it is understood that embodiments may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a battery pack receptacle that removably couples to one of multiple battery pack adapters for particular battery packs used for cordless power tool devices; and
   a universal serial bus (USB) receptacle that is coupled to the battery pack receptacle, wherein the battery pack is used as a power source for the USB receptacle,
   wherein each of the multiple battery pack adapters is configured for a different type of battery pack.

2. The apparatus of claim 1, wherein the battery pack receptacle is coupled to a utility bag.

3. The apparatus of claim 1, wherein the USB receptacle is disposed in an electronic device platform that receives an electronic device for placement on the electronic device platform.

4. The apparatus of claim 3, wherein the battery pack receptacle is wired to the USB receptacle.

5. The apparatus of claim 4, further comprising a switch device coupled to the battery pack receptacle and the USB receptacle, wherein the switch device controls an electrical connection between the battery pack receptacle and the USB receptacle.

6. The apparatus of claim 5, wherein a wire connecting the battery pack receptacle to the USB receptacle passes through an opening in the utility bag for concealing the wire within the utility bag, the electronic device platform includes a removable protective cover, and the removable protective cover comprises a window.

7. The apparatus of claim 6, further comprising a USB connector platform, wherein the USB receptacle is integrated with the USB connector platform.

8. The apparatus of claim 1, further comprising an attachment device coupled to the battery pack receptacle that attaches the battery pack receptacle to a device comprising one of a utility bag, a housing, and a platform.

9. The apparatus of claim 1, wherein the battery pack receptacle is integrated with one or more USB ports.

10. The apparatus of claim 1, wherein each of the multiple adapters is configured with a different electrical contact configuration from one another for electrically connecting to a particular type of battery pack.

11. The apparatus of claim 10, wherein each of the multiple adapters is configured with a same electrical contact configuration for electrically connecting to the battery pack receptacle.

12. The apparatus of claim 7, wherein the utility bag comprises one of: a sporting bag, a fishing bag, a luggage container, a backpack, a duffle bag, a tool bag, emergency services bag, a cooler, and a camping bag.

13. The apparatus of claim 8, wherein the battery pack receptacle is disposed in one of an interior of the utility bag or a protective pocket of the utility bag.

14. A system comprising:
    a utility bag;
    a battery pack receptacle;
    a plurality of battery pack adapters that are each configured for coupling to the battery pack receptacle, wherein each of the plurality of battery pack adapters is configured for removably coupling with a particular type of battery pack used for a cordless power tool device; and
    a universal serial bus (USB) receptacle coupled to the utility bag, wherein at least one USB port is coupled to the battery pack receptacle, wherein the battery pack receptacle transfers power from a received particular type of battery pack through a particular one of the plurality of battery pack adapters and to the USB receptacle, the USB port, or the USB receptacle and the USB port.

15. The system of claim 14, wherein the USB receptacle is disposed in an electronic device platform that receives an electronic device for placement on the electronic device platform.

16. The system of claim 14, further comprising an attachment device coupled to the battery pack receptacle that attaches the battery pack receptacle to the utility bag.

17. The system of claim 14, wherein the battery pack receptacle is integrated with one or more USB ports.

18. The system of claim 14, wherein each of the plurality of battery pack adapters is configured with a different electrical contact configuration from one another for electrically connecting to a particular type of battery pack.

19. The system of claim 18, wherein each of the plurality of battery pack adapters is configured with a same electrical contact configuration for electrically connecting to the battery pack receptacle.

20. The system of claim 19, wherein the utility bag comprises one of: a sporting bag, a fishing bag, a luggage container, a backpack, a duffle bag, a tool bag, emergency services bag, a cooler, and a camping bag, and wherein the battery pack receptacle is disposed in one of an interior of the utility bag or a protective pocket of the utility bag.

* * * * *